(12) United States Patent
Parichehrehteroujeni et al.

(10) Patent No.: US 11,968,588 B2
(45) Date of Patent: Apr. 23, 2024

(54) TECHNIQUES FOR CONDITIONAL HANDOVER AND BI-CASTING

(71) Applicant: Telefonaktiebolaget LM Ericsson (publ), Stockholm (SE)

(72) Inventors: Ali Parichehrehteroujeni, Linköping (SE); Pradeepa Ramachandra, Linköping (SE); Sakib Bin Redhwan, Linköping (SE); Reza Moosavi, Linköping (SE); Nicklas Johansson, Linköping (SE); Sofia Ek, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 379 days.

(21) Appl. No.: 17/294,832

(22) PCT Filed: Dec. 2, 2019

(86) PCT No.: PCT/SE2019/051219
§ 371 (c)(1),
(2) Date: May 18, 2021

(87) PCT Pub. No.: WO2020/122791
PCT Pub. Date: Jun. 18, 2020

(65) Prior Publication Data
US 2022/0015001 A1 Jan. 13, 2022

Related U.S. Application Data

(60) Provisional application No. 62/779,753, filed on Dec. 14, 2018.

(51) Int. Cl.
*H04W 36/32* (2009.01)
*H04L 5/00* (2006.01)
*H04W 36/00* (2009.01)

(52) U.S. Cl.
CPC .......... *H04W 36/32* (2013.01); *H04L 5/0053* (2013.01); *H04W 36/0016* (2013.01); *H04W 36/0022* (2013.01); *H04W 36/00837* (2018.08)

(58) Field of Classification Search
CPC ............ H04W 36/32; H04W 36/0016; H04W 36/0022; H04W 36/00837; H04W 36/00; H04W 36/026; H04L 5/0053
(Continued)

(56) References Cited

U.S. PATENT DOCUMENTS

2007/0049278 A1 3/2007 Lindoff et al.
2012/0106510 A1 5/2012 Kuo
(Continued)

FOREIGN PATENT DOCUMENTS

WO 2013143084 A1 10/2013
WO WO-2013143084 A1 * 10/2013 ........ H04W 36/0055
(Continued)

OTHER PUBLICATIONS

"3GPP TS 33.401 V15.5.0", 3rd Generation Partnership Project; Technical Specification Group Services and System Aspects; 3GPP System Architecture Evolution (SAE); Security architecture (Release 15), Sep. 2018, pp. 1-163.
(Continued)

*Primary Examiner* — Michael Y Mapa
(74) *Attorney, Agent, or Firm* — Murphy, Bilak & Homiller, PLLC

(57) ABSTRACT

Embodiments include methods performed by a network node, in a radio access network, RAN, that is a target node candidate for a mobility operation of a user equipment, UE. Such methods include receiving, from a source node serving the UE, a request to prepare a mobility procedure for the UE in relation to a candidate target cell associated with the network node. The request can include characteristics asso-
(Continued)

ciated with a data connection of the UE. Such methods include determining that the UE can be admitted for the requested mobility procedure based on the characteristics, and determining to activate bicasting of the data connection. Different bicasting modes can be selected. Such methods also include transmitting, to the source node, a response that includes a bicasting configuration associated with the UE. Other embodiments include complementary methods performed by source nodes, as well as network nodes configured to perform such methods.

17 Claims, 19 Drawing Sheets

(58) Field of Classification Search
USPC .................................. 370/331; 455/436–444
See application file for complete search history.

(56) References Cited

U.S. PATENT DOCUMENTS

| 2017/0013529 | A1* | 1/2017 | Persson | H04W 36/08 |
| 2020/0098251 | A1* | 3/2020 | Laselva | H04L 45/121 |

FOREIGN PATENT DOCUMENTS

| WO | 2018132051 A1 | 7/2018 |
| WO | 2019098910 A1 | 5/2019 |

OTHER PUBLICATIONS

"3GPP TS 38.401 V15.3.0", 3rd Generation Partnership Project; Technical Specification Group Radio Access Network; NG-RAN; Architecture description (Release 15), Sep. 2018, pp. 1-39.

"3GPP TS 38.420 V15.1.0", 3rd Generation Partnership Project; Technical Specification Group Radio Access Network; NG-RAN; Xn general aspects and principles (Release 15), Sep. 2018, pp. 1-14.

"3GPP TS 38.473 V15.3.0", 3rd Generation Partnership Project; Technical Specification Group Radio Access Network; NG-RAN; F1 application protocol (F1AP) (Release 15), Sep. 2018, pp. 1-176.

"3GPP TS 38.331 V15.3.0", 3rd Generation Partnership Project; Technical Specification Group Radio Access Network; NR; Radio Resource Control (RRC) protocol specification (Release 15), Sep. 2018, pp. 1-445.

"3GPP TR 38.801 V14.0.0", 3rd Generation Partnership Project; Technical Specification Group Radio Access Network; Study on new radio access technology: Radio access architecture and interfaces (Release 14), Mar. 2017, pp. 1-91.

"3GPP TR 38.804 V14.0.0", 3rd Generation Partnership Project; Technical Specification Group Radio Access Network; Study on New Radio Access Technology; Radio Interface Protocol Aspects (Release 14), Mar. 2017, pp. 1-57.

"3GPP TS 23.501 V15.3.0", 3rd Generation Partnership Project; Technical Specification Group Services and System Aspects; System Architecture for the 5G System; Stage 2 (Release 15), Sep. 2018, pp. 1-226.

* cited by examiner

```
-- ASN1START
-- TAG-HANDOVER-PREPARATION-INFORMATION-START

HandoverPreparationInformation ::=  SEQUENCE {
    criticalExtensions              CHOICE  {
        c1                              CHOICE {
           handoverPreparationInformation    HandoverPreparationInformation-IEs,
             spare3 NULL, spare2 NULL, spare1 NULL
        },
        criticalExtensionsFuture        SEQUENCE {}
    }
}
HandoverPreparationInformation-IEs ::= SEQUENCE {
    ue-CapabilityRAT-List           UE-CapabilityRAT-ContainerList,
    sourceConfig                    AS-Config              OPTIONAL, -- Cond HO
    rrm-Config                      RRM-Config             OPTIONAL,
    as-Context                      AS-Context             OPTIONAL,
    nonCriticalExtension            SEQUENCE {}            OPTIONAL
}
AS-Config ::=                       SEQUENCE {
    rrcReconfiguration                OCTET STRING (CONTAINING
RRCReconfiguration),
    ...
}
AS-Context ::=                      SEQUENCE {
    reestablishmentInfo               ReestablishmentInfo    OPTIONAL,
    configRestrictInfo                ConfigRestrictInfoSCG  OPTIONAL,
    ...,
    [[  ran-NotificationAreaInfo     RAN-NotificationAreaInfo OPTIONAL
    ]]
}
ReestablishmentInfo ::=             SEQUENCE {
    sourcePhysCellId                  PhysCellId,
    targetCellShortMAC-I              ShortMAC-I,
    additionalReestabInfoList         ReestabNCellInfoList     OPTIONAL
)
ReestabNCellInfoList ::=        SEQUENCE(SIZE(1..maxCellPrep)) OF ReestabNCellInfo
ReestabNCellInfo::=             SEQUENCE{
    cellIdentity                  CellIdentity,
    key-gNodeB-Star               BIT STRING (SIZE (256)),
    shortMAC-I                    ShortMAC-I
}
RRM-Config ::=                  SEQUENCE {
    ue-InactiveTime                 ENUMERATED {
                                      s1, s2, s3, s5, s7, s10, s15, s20, s25, s30,
                                      s40, s50, min1, min1s20c, min1s40, min2,
                                      min2s30, min3, min3s30, min4, min5, min6,
                                      min7, min8, min9, min10, min12, min14, min17,
                                      min20, min24, min28, min33, min38, min44,
                                      min50, hr1, hr1min30, hr2, hr2min30, hr3,
                                      hr3min30, hr4, hr5, hr6, hr8, hr10, hr13,
                                      hr16, hr20, day1, day1hr12, day2, day2hr12,
                                      day3, day4, day5, day7, day10, day14, day19,
                                      day24, day30, dayMoreThan30
                                    }                              OPTIONAL,
    candidateCellInfoList         MeasResultList2NR                OPTIONAL,
    ...
}
-- TAG-HANDOVER-PREPARATION-INFORMATION-STOP
-- ASN1STOP
```

*FIG. 6*

```
-- ASN1START
-- TAG-HANDOVER-COMMAND-START

HandoverCommand ::=              SEQUENCE {
    criticalExtensions              CHOICE {
        c1                             CHOICE{
            handoverCommand                HandoverCommand-IEs,
            spare3 NULL, spare2 NULL, spare1 NULL
        },
        criticalExtensionsFuture       SEQUENCE {}
    }
}

HandoverCommand-IEs ::=          SEQUENCE {
    handoverCommandMessage          OCTET STRING (CONTAINING RRCReconfiguration),
    nonCriticalExtension            SEQUENCE {}                          OPTIONAL
}

-- TAG-HANDOVER-COMMAND-STOP
-- ASN1STOP
```

*FIG. 7*

```
-- ASN1START
...
RRM-Config ::=                   SEQUENCE {
    ue-InactiveTime                 ENUMERATED {
                                       s1, s2, s3, s5, s7, s10, s15, s20, s25, s30,
                                       s40, s50, min1, min1s20c, min1s40, min2,
                                       min2s30, min3, min3s30, min4, min5, min6,
                                       min7, min8, min9, min10, min12, min14, min17,
                                       min20, min24, min28, min33, min38, min44,
                                       min50, hr1, hr1min30, hr2, hr2min30, hr3,
                                       hr3min30, hr4, hr5, hr6, hr8, hr10, hr13,
                                       hr16, hr20, day1, day1hr12, day2, day2hr12,
                                       day3, day4, day5, day7, day10, day14, day19,
                                       day24, day30, dayMoreThan30
                                    }                                    OPTIONAL,
    ue-ActiveTime                   INTEGER                              OPTIONAL,
    ue-RequiredDataRate             INTEGER                              OPTIONAL,
    ue-BufferStatus                 INTEGER                              OPTIONAL,
    ue-QCI                          INTEGER                              OPTIONAL,
    candidateCellInfoList           MeasResultList2NR                    OPTIONAL,
    ...
}
...
-- ASN1STOP
```

*FIG. 8*

```
-- ASN1START
-- TAG-HANDOVER-COMMAND-START

HandoverCommand ::=                 SEQUENCE {
    criticalExtensions              CHOICE  {
        c1                              CHOICE{
            handoverCommand                     HandoverCommand-IEs,
            spare3 NULL, spare2 NULL, spare1 NULL
        },
        criticalExtensionsFuture    SEQUENCE {}
    }
}

HandoverCommand-IEs ::=         SEQUENCE {
    handoverCommandMessage          OCTET STRING (CONTAINING RRCReconfiguration),
    nonCriticalExtension            SEQUENCE {}         OPTIONAL
    grantedBufferSize               INTEGER             OPTIONAL
    bicastingMode                   BINARY              OPTIONAL
}

-- TAG-HANDOVER-COMMAND-STOP
-- ASN1STOP
```

*FIG. 11*

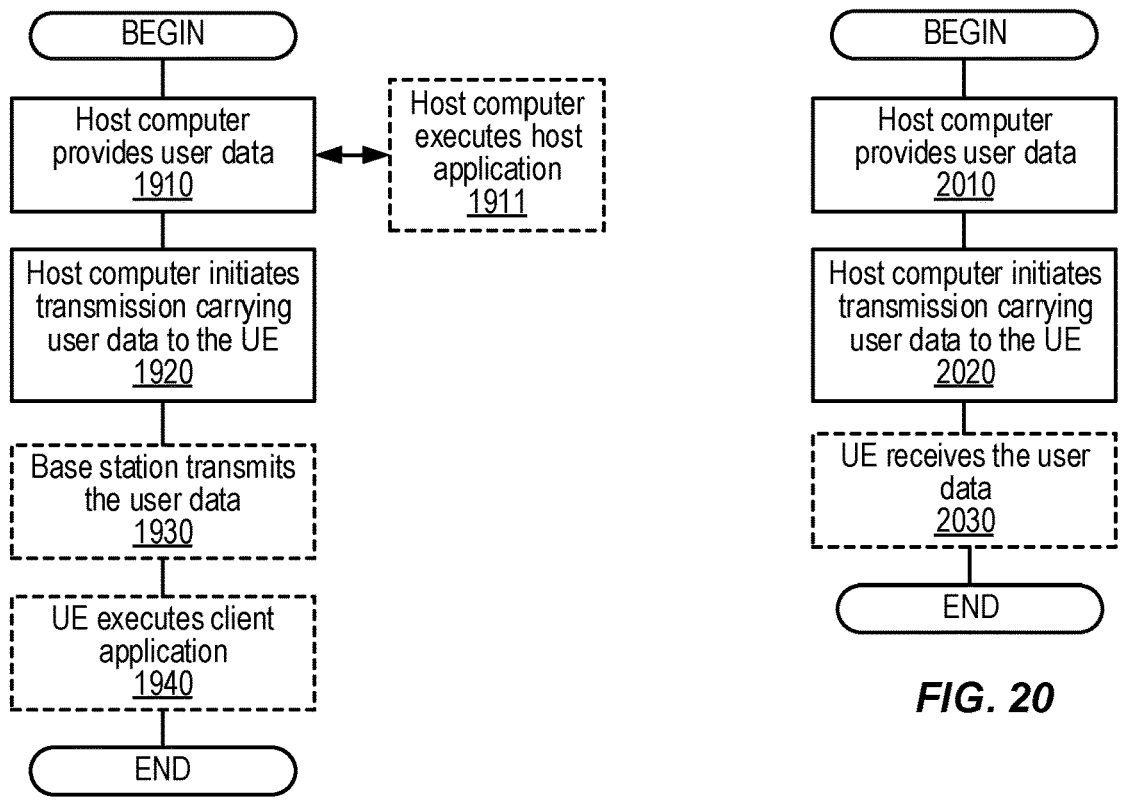
*FIG. 19*
*FIG. 20*
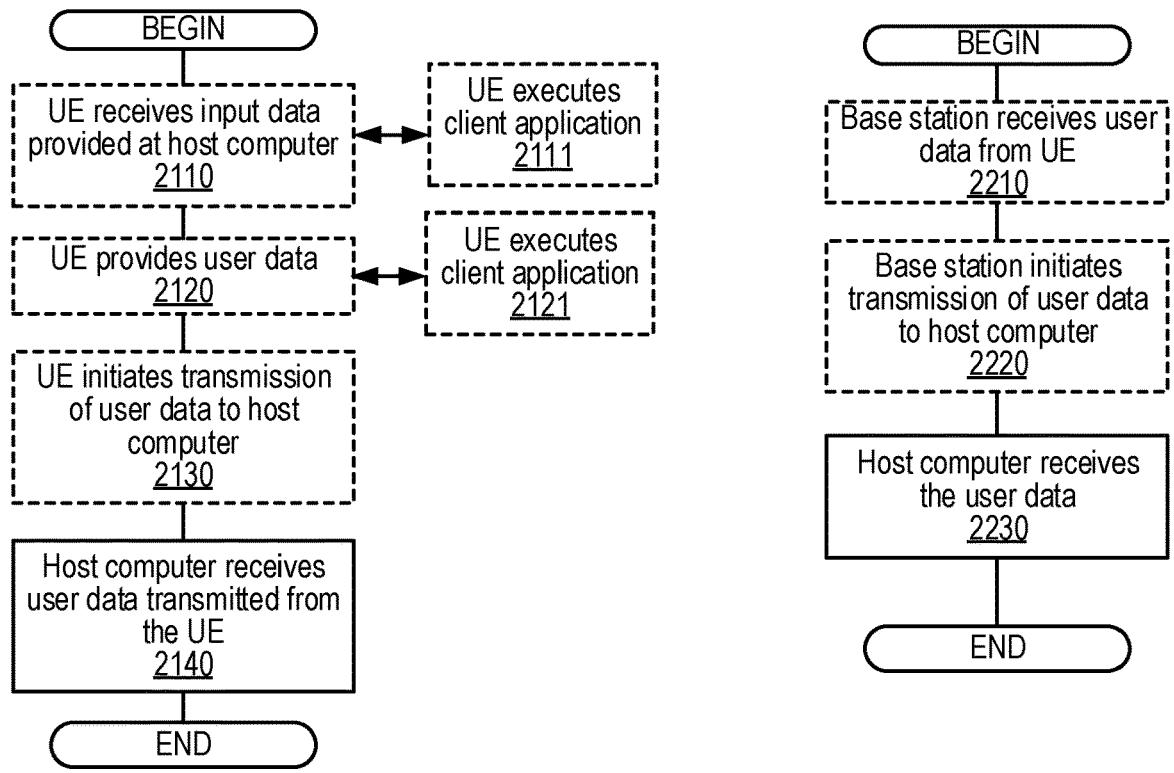
*FIG. 21*
*FIG. 22*

TECHNIQUES FOR CONDITIONAL HANDOVER AND BI-CASTING

TECHNICAL FIELD

The present application relates generally to the field of wireless communications, and more specifically to devices, methods, and computer-readable media that improve mobility operations by a wireless device or user equipment (UE) operating in a wireless network.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Long-Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

LTE Release 10 (Rel-10) supports bandwidths larger than 20 MHz. One important requirement on Rel-10 is to assure backward compatibility with LTE Release-8. This should also include spectrum compatibility. As such, a wideband LTE Rel-10 carrier (e.g., wider than 20 MHz) should appear as a number of carriers to an LTE Rel-8 ("legacy") terminal. Each such carrier can be referred to as a Component Carrier (CC). For an efficient use of a wide carrier also for legacy terminals, legacy terminals can be scheduled in all parts of the wideband LTE Rel-10 carrier. One exemplary way to achieve this is by means of Carrier Aggregation (CA), whereby a Rel-10 terminal can receive multiple CCs, each preferably having the same structure as a Rel-8 carrier. Similarly, one of the enhancements in LTE Rel-11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

An overall exemplary architecture of an LTE network is shown in FIG. 1. E-UTRAN 100 comprises one or more evolved Node B's (eNB), such as eNBs 105, 110, and 115, and one or more user equipment (UE), such as UE 120. As used within 3GPP specifications, "user equipment" (or "UE") can refer to any wireless communication device (e.g., smartphone or computing device) that is capable of communicating with 3GPP-standard-compliant network equipment, including E-UTRAN and earlier-generation RANs (e.g., UTRAN/"3G" and/or GERAN/"2G") as well as later-generation RANs in some cases.

As specified by 3GPP, E-UTRAN 100 is responsible for all radio-related functions in the network, including radio bearer control, radio admission control, radio mobility control, scheduling, and dynamic allocation of resources to UEs in uplink (UL) and downlink (DL), as well as security of the communications with the UE. These functions reside in the eNBs, such as eNBs 105, 110, and 115, which communicate with each other via an X2 interface. The eNBs also are responsible for the E-UTRAN interface to EPC 130, specifically the S1 interface to the Mobility Management Entity (MME) and the Serving Gateway (SGW), shown collectively as MME/S-GWs 134 and 138 in FIG. 1.

In general, the MME/S-GW handles both the overall control of the UE and data flow between UEs (such as UE 120) and the rest of the EPC. More specifically, the MME processes the signaling (e.g., control plane, CP) protocols between UEs and EPC 130, which are known as the Non-Access Stratum (NAS) protocols. The S-GW handles all Internet Protocol (IP) data packets (e.g., user plane, UP) between UEs and EPC 130, and serves as the local mobility anchor for the data bearers when a UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)—labelled EPC-UDR 135 in FIG. 1—via a Ud interface. The EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and 51 (E-UTRAN/EPC interface), each using a specific set of protocols, i.e., Radio Protocols and S1 Protocols. Although not shown in FIG. 2A, each of the protocol sets can be further segmented into user plane and control plane protocol functionality. The user and control planes are also referred to as U-plane and C-plane, respectively. On the Uu interface, the U-plane carries user information (e.g., data packets) while the C-plane carries control information between UE and E-UTRAN.

FIG. 2B illustrates a block diagram of an exemplary C-plane protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression. The exemplary protocol stack also includes non-access stratum (NAS) signaling between the UE and the MME.

FIG. 2C shows a block diagram of an exemplary LTE radio interface protocol architecture from the perspective of the PHY layer. The interfaces between the various layers are provided by Service Access Points (SAPs), indicated by the ovals in FIG. 2C. The PHY layer interfaces with the MAC and RRC protocol layers described above. The PHY, MAC, and RRC are also referred to as Layers 1-3, respectively, in the figure. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation, and demodulation of physical channels; transmit diversity; and beamforming multiple input multiple output (MIMO) antenna processing. The PHY layer also receives control information (e.g., commands) from RRC and provides various information to RRC, such as radio measurements.

Downlink (i.e., network node to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

Uplink (i.e., UE to network node) physical channels provided by the LTE PHY include Physical Uplink Shared Channel (PUSCH), Physical Uplink Control Channel (PUCCH), and Physical Random-Access Channel (PRACH). In addition, the LTE PHY uplink includes various reference signals including demodulation reference signals (DM-RS), which are transmitted to aid the network node in the reception of an associated PUCCH or PUSCH; and sounding reference signals (SRS), which are not associated with any uplink channel.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). The LTE FDD downlink (DL) radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary FDD DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier bandwidth of 15 kHz. The value of $N_{sc}$ is configurable based upon the available channel bandwidth. Since persons of ordinary skill in the art are familiar with the principles of OFDM, further details are omitted in this description.

Furthermore, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}_{sc}$ is typically either 12 (with a 15-kHz sub-carrier bandwidth) or 24 (7.5-kHz bandwidth). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY DL comprise $N^{DL}_{RB}$ PRB pairs, each of which comprises $2N^{DL}_{symb} \cdot N^{RB}_{sc}$ REs. For a normal CP and 15-KHz sub-carrier bandwidth, a PRB pair comprises 168 REs.

The LTE FDD uplink (UL) radio frame is configured in a similar manner as the exemplary FDD DL radio frame discussed above. Using terminology consistent with the above DL description, each UL slot consists of $N^{UL}_{symb}$ OFDM symbols, each of which is comprised of $N_{sc}$ OFDM subcarriers.

As discussed above, the LTE PHY maps the various DL and UL physical channels to the PHY resources. For example, the PHICH carries HARQ feedback (e.g., ACK/NAK) for UL transmissions by the UEs. Similarly, PDCCH carries scheduling assignments, channel quality feedback (e.g., CSI) for the UL channel, and other control information. Likewise, a PUCCH carries uplink control information such as scheduling requests, CSI for the downlink channel, HARQ feedback for network node DL transmissions, and other control information. Both PDCCH and PUCCH can be transmitted on aggregations of one or several consecutive control channel elements (CCEs), and a CCE is mapped to the physical resource based on resource element groups (REGs), each of which is comprised of a plurality of REs. For example, a CCE can comprise nine (9) REGs, each of which can comprise four (4) REs.

Since LTE-release 8, three Signaling Radio Bearers (SRBs), namely SRB0, SRB1 and SRB2 have been available for the transport of RRC and Non Access Stratum (NAS) messages between the UE and network node. A new SRB, known as SRB1bis, was also introduced in rel-13 for supporting DoNAS (Data Over NAS) in NB-IoT. SRB0 is for RRC messages using the CCCH logical channel, and it is used for handling RRC connection setup, RRC connection resume and RRC connection re-establishment. Once the UE is connected to the network node (i.e., RRC connection setup or RRC connection reestablishment/resume has succeeded), SRB1 is used for handling RRC messages (which may include a piggybacked NAS message) as well as for NAS messages prior to the establishment of SRB2, all using DCCH logical channel. On the other hand, SRB2 is used for RRC messages, including logged measurement information as well as NAS messages, all using DCCH logical channel. SRB2 has a lower priority than SRB1, because logged measurement information and NAS messages can be lengthy and could cause the blocking of more urgent and smaller SRB1 messages. SRB2 is always configured by E-UTRAN after security activation.

As briefly mentioned above, the LTE RRC layer (shown in FIGS. 2B-C) controls communications between a UE and an eNB at the radio interface, as well as the mobility of a UE between cells in the E-UTRAN. A common mobility procedure for UEs in RRC_CONNECTED state (e.g., with an active connection) is handover (HO) between cells. However, handover can have various problems related to robustness. For example, the HO command (e.g., RRCConnectionReconfiguration with mobilityControlInfo or RRCReconfiguration with a reconfigurationWithSync) is normally sent when the radio conditions for the UE are already quite bad. As such, the HO command may need to be segmented (e.g., to allow for redundancy to protect against errors) and/or retransmitted (e.g., using HARQ) one or more times before it reaches the UE. In such case, the HO command may not reach the UE in time (or at all) before the degraded connection with the source node (e.g., the node hosting the UE's current serving cell) is dropped.

Some "conditional mobility" techniques have been proposed to address these and other difficulties with handovers and other mobility procedures. Nevertheless, these proposed techniques suffer from various deficiencies—with respect to the UE and/or the network—that make them unsuitable for handover of UEs that are currently utilizing applications that are data-intensive (e.g., video streaming) or delay-sensitive (e.g., packet voice).

SUMMARY

Accordingly, exemplary embodiments of the present disclosure address these and other mobility-related issues in wireless communication networks by providing improvements to mobility operations, such as handovers (including conditional handovers) between a source node (or cell) and a target node (or cell).

Exemplary embodiments of the present disclosure include methods (e.g., procedures) performed by a network node (e.g., base station, eNB, gNB, etc. or component thereof), in a radio access network (RAN), that is a target node candidate for a mobility operation of a user equipment (UE). These exemplary methods can include receiving, from a source node serving the UE, a request to prepare a mobility procedure for the UE in relation to a candidate target cell associated with the network node. The request can include one or more characteristics associated with a data connection of the UE. For example, the one or more characteristics can include any of the following: status of a UE buffer at the source node; UE required data rate; UE connection active time; UE QoS class indicator (QCI); and Transmission Control Protocol (TCP) socket for the data connection. As a further example, the requested mobility procedure can include any of the following: handover, conditional handover, resume, re-establishment, reconfiguration with synchronization, beam switch, and secondary cell (SCell) addition.

These exemplary methods can also include, based on the one or more characteristics, determining that the UE can be admitted for the requested mobility procedure. In some embodiments, determining that the UE can be admitted can be based on the status of the UE buffer at the source node being less than an amount of available buffer space associated with the network node. In some embodiments, determining that the UE can be admitted can be based on the UE required data rate being less than an available transmission capacity in the candidate target cell.

These exemplary methods can also include determining to activate bicasting of the data connection, and transmitting, to the source node, a response that includes a bicasting configuration associated with the UE.

In some embodiments, determining to activate bicasting can be based on at least one characteristic of the data connection observed by listening to the originating TCP socket for the data connection. In some embodiments, determining to activate bicasting can be based on at least one of the following: the UE connection active time being greater than a first threshold, and the UE required data rate being greater than a second threshold. In some embodiments, determining to activate bicasting can be based on a delay budget associated with the UE QCI being less than a third threshold.

In some embodiments, these exemplary methods can also include selecting a bicasting mode from a first mode and a second mode. For example, the first mode can be associated with with a first interface (e.g., X2, Xn) to the source node, and the second mode can be associated with a second interface (e.g., S1, NG) to a core network. In such embodiments, the bicasting configuration (e.g., transmitted to the source node) can include an indication of the selected bicasting mode and an indication of a size of a buffer space granted by the network node to the UE.

In such embodiments, selecting the bicast mode can include selecting the second mode based on the UE required data rate being less than or equal to an available capacity on the second interface (e.g., S1, NG), and selecting the first mode based on the UE required data rate being greater than the available capacity on the second interface.

In some embodiments, these exemplary methods can also include, based on selecting the second mode, sending a request, to the core network, to initiate bicasting the data connection to the target node. In such embodiments, the request can include a bicast start position associated with a protocol layer used in the data connection. For example, the bicast start position can be a TCP sequence number.

In some embodiments, these exemplary methods can also include buffering a first portion of bicast data in the buffer space granted by the network node to the UE. This buffering can occur, for example, in response to either the source node (first mode) or the core network (second mode) initiating the requested data bicast. In such embodiments, these exemplary methods can also include receiving an acknowledgement that the UE has successfully received the first portion. This acknowledgement can be received from the source node or the core network, according to the selected mode. In various embodiments, the acknowledgement can comprise a TCP Acknowledgement Number, a PDCP Sequence Number, or any other protocol-related parameter. In such embodiments, these exemplary methods can also include, in response to the acknowledgement, buffering a second portion of bicast data in the buffer space granted by the network node to the UE by overwriting at least some of the first portion (i.e., that was previously buffered). In this manner, the network node can fulfill the requirements of data-intensive and/or delay-sensitive UEs during handover with a reasonable amount of buffer resources.

Other exemplary embodiments of the present disclosure include additional methods (e.g., procedures) performed by a source node (e.g., base station, eNB, gNB, etc. or component thereof) in a radio access network (RAN), for mobility of a user equipment (UE) served by the source node. These exemplary methods can include transmitting, to a target node, a request to prepare a mobility procedure for the UE in relation to a candidate target cell associated with the target node. The request can include one or more characteristics associated with a data connection of the UE. For example, the one or more characteristics can include any of the following: status of a UE buffer at the source node; UE required data rate; UE connection active time; UE QoS class indicator (QCI); and Transmission Control Protocol (TCP) socket for the data connection. As a further example, the requested mobility procedure can include any of the following: handover, conditional handover, resume, re-establishment, reconfiguration with synchronization, beam switch, and secondary cell (SCell) addition.

These exemplary methods can also include receiving, from the target node, a response to the request, the response including a bicasting configuration associated with the UE. In some embodiments, the bicasting configuration can include an indication of a bicasting mode selected by the target node. The selected bicasting mode can be a first mode associated with with a first interface (e.g., X2, Xn) to the target node, or a second mode associated with a second interface (e.g., S1, NG) between the target node and a core network. The bicasting configuration can also include an indication of a size of a buffer space granted by the target node to the UE. For example, the indication can indicate the portion of a data buffer, comprising or associated with the target node, that is allocated to receive bicast data for the UE undergoing the mobility operation.

In some embodiments, these exemplary methods can also include, based on the bicasting configuration indicating the first mode, initiating bicasting of the data connection to the target node via the first interface. In some embodiments, these exemplary methods can also include, based on the bicasting configuration indicating the second mode, sending a request, to the core network, to initiate bicasting of the data connection to the target node. The request can include a bicast start position associated with a protocol layer used in the data connection. For example, the bicast start position can be a TCP Sequence Number.

In some embodiments, these exemplary methods can also include transmitting, to the target node, an acknowledgement that the UE has successfully received a first portion of the bicast data via the source node. The size of the first portion can be less than the size of the buffer space granted by the target node to the UE. In various embodiments, the acknowledgement can include a TCP Acknowledgement Number, a PDCP Sequence Number, or any suitable protocol-related parameter. For example, the first portion can represent the amount of successfully-received data since the most recent acknowledgement (e.g., related to a previous portion) was transmitted by the source node to the target node.

Other exemplary embodiments include network nodes (e.g., gNBs, eNBs, base stations, etc. or components thereof) configured to perform operations corresponding to any of the exemplary methods described herein. Other exemplary embodiments include non-transitory, computer-readable media storing computer-executable instructions that, when executed by processing circuitry of a network node, configure the network node to perform operations corresponding to any of the exemplary methods described herein.

These and other objects, features and advantages of exemplary embodiments of the present disclosure will become apparent upon reading the following Detailed Description in view of the Drawings briefly described below.

BRIEF DESCRIPTION OF THE DRAWINGS

FIG. 4, which is divided into

FIG. 6 shows an exemplary ASN.1 data structure that describes the content of an NR HandoverPreparationInformation message.

FIG. 7 shows an exemplary ASN.1 data structure that describes the content of an NR HandoverCommand message.

FIG. 8 shows an exemplary ASN.1 data structure that describes the content of an RRM-Config IE of an LTE or NR HandoverPreparationInformation message, according to various exemplary embodiments of the present disclosure.

FIG. 11 shows an exemplary ASN.1 data structure that describes the content of an NR HandoverCommand message sent from a target node to a source node, according to various exemplary embodiments of the present disclosure.

FIGS. 19-22 are flow diagrams of exemplary methods and/or procedures for transmission and/or reception of user data, according to various exemplary embodiments of the present disclosure.

DETAILED DESCRIPTION

Figure 1:
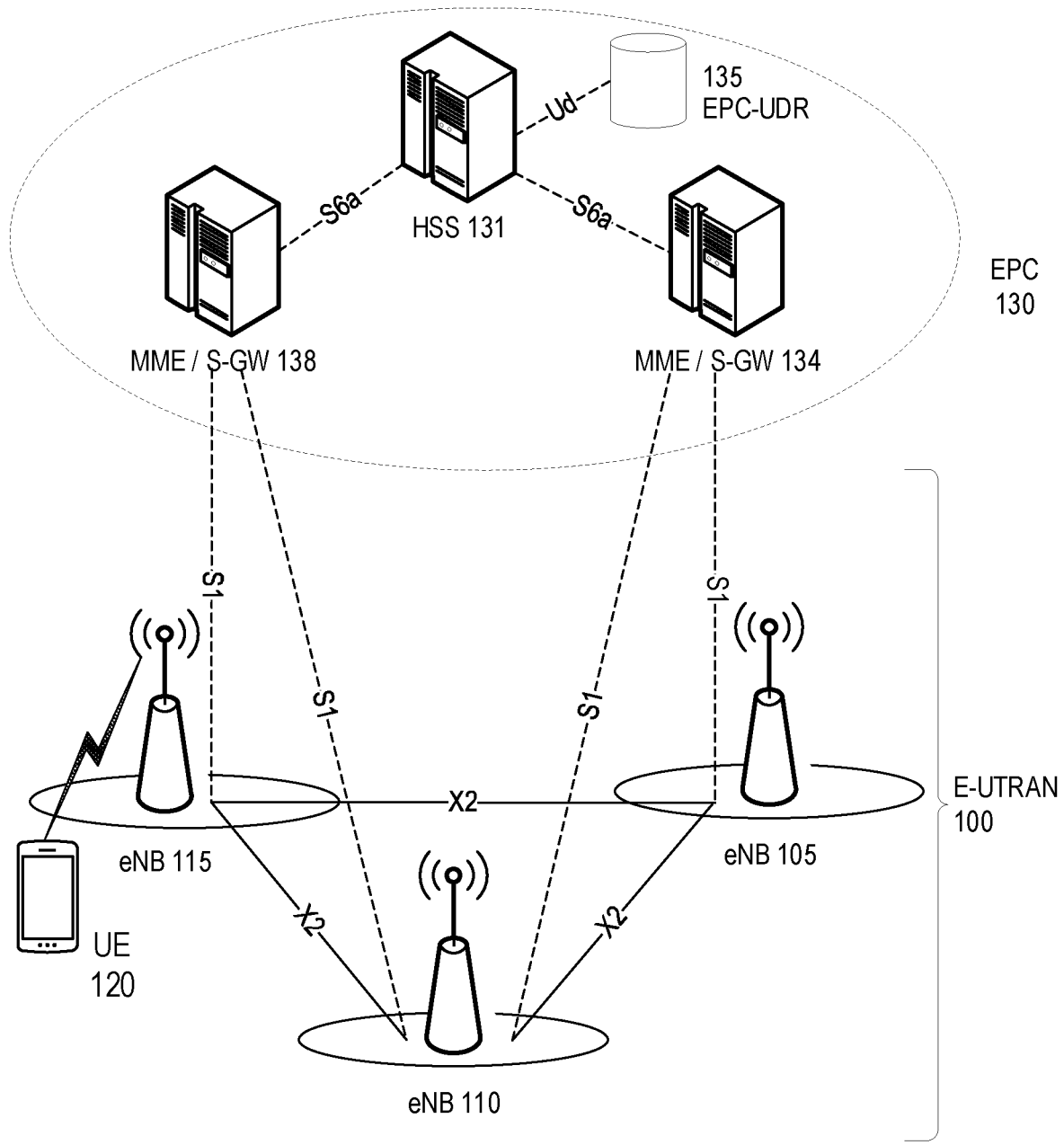
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
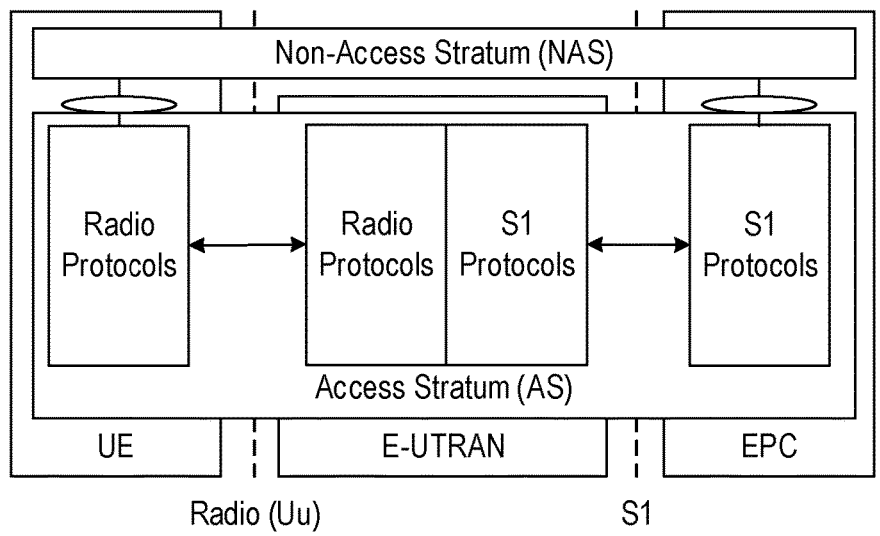
FIG. 2A is a high-level block diagram of an exemplary E-UTRAN architecture in terms of its constituent components, protocols, and interfaces.
Figure 2B:
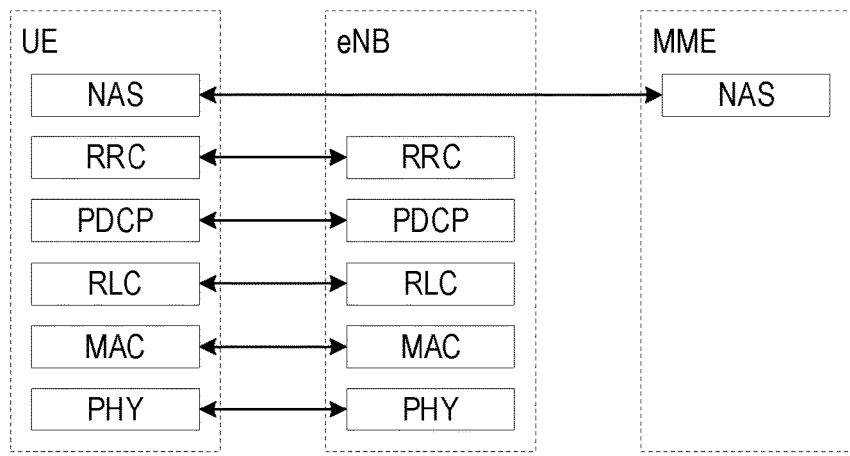
FIG. 2B is a block diagram of exemplary protocol layers of the control-plane portion of the radio (Uu) interface between a user equipment (UE) and the E-UTRAN.
Figure 2C:
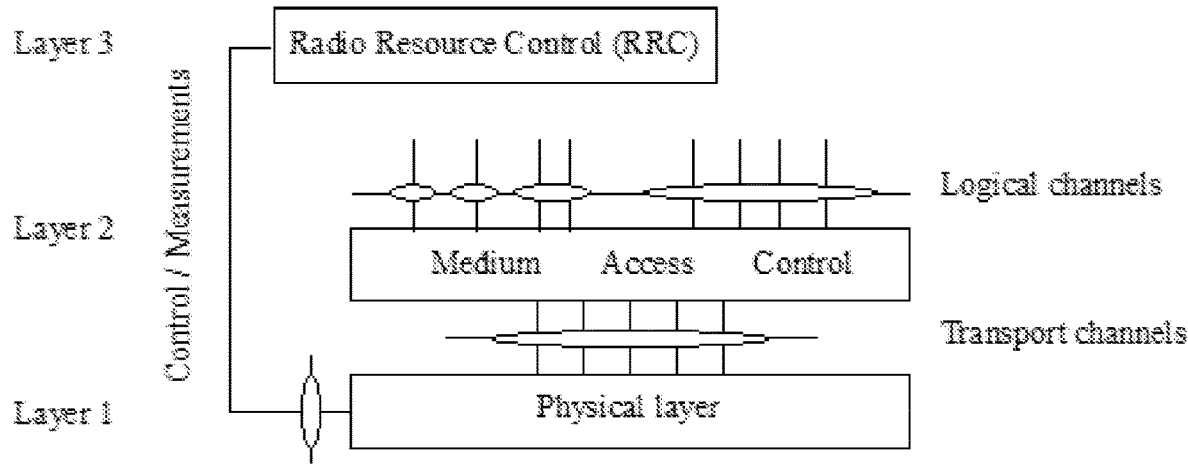
FIG. 2C is a block diagram of an exemplary LTE radio interface protocol architecture from the perspective of the PHY layer.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, the following terms are used throughout the description given below:

Radio Node: As used herein, a "radio node" can be either a "radio access node" or a "wireless device."

Radio Access Node: As used herein, a "radio access node" (or "radio network node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (network node) in a 3GPP LTE network), a high-power or macro base station, a low-power base station (e.g., a micro base station, a pico base station, a home eNB, or the like), an integrated access backhaul (IAB) node, and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Unless otherwise noted, the term "wireless device" is used interchangeably herein with "user equipment" (or "UE" for short). Some examples of a wireless device include, but are not limited to, a UE in a 3GPP network and a Machine Type Communication (MTC) device. Communicating wirelessly can involve transmitting and/or receiving wireless signals using electromagnetic waves, radio waves, infrared waves, and/or other types of signals suitable for conveying information through air.

Network Node: As used herein, a "network node" is any node that is either part of the radio access network or the core network of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is oftentimes used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell" is used herein, it should be understood that (particularly with respect to 5G NR) beams may be used instead of cells and, as such, concepts described herein apply equally to both cells and beams.

As briefly mentioned above, UE mobility procedures (e.g., handover) can have various problems related to robustness. For example, a HO command is normally sent when the radio conditions for the UE are already quite bad. As such, the HO command may need to be segmented (e.g., to allow for redundancy to protect against errors) and/or retransmitted (e.g., using HARQ) one or more times before it reaches the UE. In such case, the HO command may not reach the UE in time (or at all) before the degraded connection with the source node (e.g., the node hosting the UE's current serving cell) is dropped. Some "conditional mobility" techniques have been proposed to address these and other difficulties with handovers and other mobility procedures. Nevertheless, these proposed techniques suffer from various deficiencies—with respect to the UE and/or the network—that make them unsuitable for handover of UEs that are currently utilizing applications that are data-intensive (e.g., video streaming) or delay-sensitive (e.g., packet voice). These issues are discussed in more detail below.

Prior to Rel-13, there were two RRC states defined for a UE. More specifically, after the UE is powered ON it will be in the RRC_IDLE state until the RRC connection is established, at which time it will transition to RRC_CONNECTED state (where data transfer can occur). After a connection is released, the UE returns to RRC_IDLE In RRC_IDLE state, the UE's radio is active on a discontinuous reception (DRX) schedule configured by upper layers. During DRX active periods, an RRC_IDLE UE receives system information (SI) broadcast by a serving cell, performs measurements of neighbor cells to support cell reselection, and monitors a paging channel on PDCCH for pages from the EPC via eNB. An RRC_IDLE UE is known in the EPC and has an assigned IP address, but is not known to the serving eNB (e.g., there is no stored context).

In LTE Rel-13, a mechanism was introduced for the UE to be suspended by the network in a suspended state similar to RRC_IDLE but with some important differences. First, the suspended state is not a third RRC "state" alongside RRC_IDLE and RRC_CONNECTED; rather it can be viewed as a "substate" of RRC_IDLE. Second, both the UE and the serving eNB store the UE's AS (e.g., S1-AP) context and RRC context after suspension. Later when the suspended UE needs to resume a connection (e.g., to send UL data), instead of going through the conventional service request procedure, the suspended UE merely sends an RRC-ConnectionResume-Request message to the eNB. The eNB resumes the S1AP context and responds with a RRCConnectionResume message. There is no elaborate exchange of security context between MME and eNB and no setup of AS security context. The preserved AS and RRC contexts are merely resumed from where they were suspended earlier, Reducing the signaling can provide reduced UE latency (e.g. for smart phones accessing Internet) and reduced UE signaling, which can lead to reduced UE energy consumption, particularly for machine type communication (MTC) devices that send very little data (i.e., signaling being a primary consumer of energy).

To support mobility (e.g., handover or reselection) between cells and/or beams, a UE can perform periodic cell search and measurements of signal power and quality (e.g., reference signal received power, RSRP, and reference signal received quality, RSRQ) in both RRC_CONNECTED and RRC_IDLE modes. The UE is responsible for detecting new neighbor cells, and for tracking and monitoring already detected cells. The detected cells and the associated measurement values are reported to the network. An LTE UE can perform such measurements on various downlink reference signals (RS) including, e.g., cell-specific Reference Signal (CRS), MBSFN RS, UE-specific demodulation RS (DM-RS) associated with PDSCH, DM-RS associated with EPDCCH or M/NPDCCH, positioning RS (PRS), and channel state information RS (CSI-RS).

UE measurement reports to the network can be configured to be periodic or aperiodic (e.g., based a particular event). For example, the network can configure a UE to perform measurements on various carrier frequencies and various radio access technologies (RATs) corresponding to neighbor cells, as well as for various purposes including, e.g., mobility and positioning. The configuration for each of these measurements is referred to as a "measurement object." Furthermore, the UE can be configured to perform the measurements according to a "measurement gap pattern" (or "gap pattern" for short), which can include a measurement gap repetition period (MGRP, i.e., how often a recurring gap is available for measurements) and a measurement gap length (MGL, i.e., a length of each recurring gap).

In LTE, the concept of Time-To-Trigger (TTT) is used to ensure that the event triggering criterion is satisfied for a long enough duration before a measurement report is sent by the UE. The triggering criterion and TTT are configured in a reportConfig message (or an information element, IE, of a message) sent by the network to the UE. The value of TTT provided in reportConfig is applicable to all neighbor cells of the UE that could trigger a measurement report based on the specified triggering criterion.

While LTE was primarily designed for user-to-user communications, 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band) and URLLC (Ultra-Reliable Low Latency Communication). These services can have different requirements and objectives. For example, URLLC is intended to provide a data service with extremely strict error and latency requirements, e.g., error probabilities as low as $10^{-5}$ or lower and 1 ms end-to-end latency or lower. For eMBB, the requirements on latency and error probability can be less stringent whereas the required supported peak rate and/or spectral efficiency can be higher.

Similar to LTE, the NR PHY uses CP-OFDM (Cyclic Prefix Orthogonal Frequency Division Multiplexing) in the DL and both CP-OFDM and DFT-spread OFDM (DFT-S-OFDM) in the UL. In the time domain, NR DL and UL physical resources are organized into equal-sized, 1-ms subframes. Each subframe includes one or more slots, and each slot includes 14 (for normal cyclic prefix) or 12 (for extended cyclic prefix) time-domain symbols.

Figure 3:
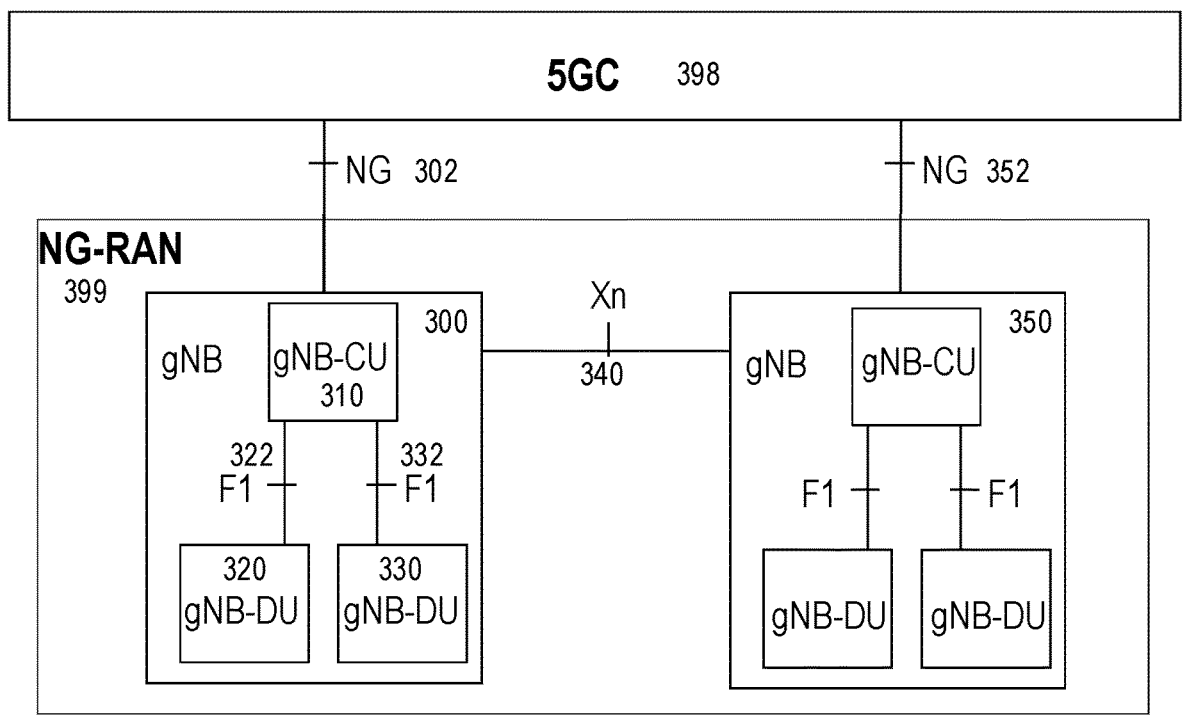
FIG. 3 illustrates a high-level view of the 5G/NR network architecture, including split central unit (CU)-distributed unit (DU) split architecture of gNBs.

FIG. 3 illustrates a high-level view of the 5G network architecture, consisting of a Next Generation RAN (NG-RAN) 399 and a 5G Core (5GC) 398. NG-RAN 399 can include one or more gNodeB's (gNBs) connected to the 5GC via one or more NG interfaces, such as gNBs 300, 350 connected to 5GC 398 via interfaces 302, 352, respectively. More specifically, gNBs 300, 350 can be connected to one or more Access and Mobility Management Functions (AMF) in the 5GC 398 via respective NG-C interfaces. Similarly, gNBs 300, 350 can be connected to one or more User Plane Functions (UPFs) in 5GC 398 via respective NG-U interfaces.

Although not shown, in some deployments 5GC 398 can be replaced by an Evolved Packet Core (EPC), which conventionally has been used together with LTE E-UTRAN. In such deployments, gNBs 300, 350 can connect to one or more Mobility Management Entities (MMEs) in EPC via respective S1-C interfaces. Similarly, gNBs 300, 350 can connect to one or more Serving Gateways (SGWs) in EPC via respective NG-U interfaces.

In addition, the gNBs can be connected to each other via one or more Xn interfaces, such as Xn interface 340 between gNBs 300 and 350. The radio technology for the NG-RAN is often referred to as "New Radio" (NR). For the NR interface to UEs, each of the gNBs can support frequency division duplexing (FDD), time division duplexing (TDD), or a combination thereof.

NG-RAN 399 can be partitioned into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region" which is defined in 3GPP TS 23.501. If security protection for CP and UP data on TNL of NG-RAN interfaces is supported, NDS/IP (3GPP TS 33.401) shall be applied.

The NG-RAN logical nodes shown in FIG. 3 (and described in 3GPP TS 38.401 and 3GPP TR 38.801) include a Central Unit (CU or gNB-CU) and one or more Distributed Units (DU or gNB-DU). For example, gNB 300 includes gNB-CU 310 and gNB-DUs 320 and 330. CUs (e.g., gNB-CU 310) are logical nodes that host higher-layer protocols and perform various gNB functions such controlling the operation of DUs. A DU (e.g., gNB-DUs 320, 330) is a decentralized logical node that hosts lower layer protocols and can include, depending on the functional split option, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to one or more gNB-DUs over respective F1 logical interfaces, such as interfaces 322 and 332 shown in FIG. 3. However, a gNB-DU can be connected to only a single gNB-CU. The gNB-CU and connected gNB-DU(s) are only visible to other gNBs and the 5GC as a gNB. In other words, the F1 interface is not visible beyond gNB-CU. Furthermore, the F1 interface between the gNB-CU and gNB-DU is specified and/or based on the following general principles:

F1 is an open interface;

F1 supports the exchange of signalling information between respective endpoints, as well as data transmission to the respective endpoints;

from a logical standpoint, F1 is a point-to-point interface between the endpoints (even in the absence of a physical direct connection between the endpoints);

F1 supports control plane (CP) and user plane (UP) separation, such that a gNB-CU may be separated in CP and UP;

F1 separates Radio Network Layer (RNL) and Transport Network Layer (TNL);

F1 enables exchange of user-equipment (UE) associated information and non-UE associated information;

F1 is defined to be future proof with respect to new requirements, services, and functions;

A gNB terminates X2, Xn, NG and S1-U interfaces and, for the F1 interface between DU and CU, utilizes the F1 application part protocol (F1-AP) which is defined in 3GPP TS 38.473.

Furthermore, a CU can host protocols such as RRC and PDCP, while a DU can host protocols such as RLC, MAC and PHY. Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some exemplary embodiments, the CU can host RRC and PDCP, where PDCP is assumed to handle both UP traffic and CP traffic. Nevertheless, other exemplary embodiments may utilize other protocol splits that by hosting certain protocols in the CU and certain others in the DU. Exemplary embodiments can also locate centralized control plane protocols (e.g., PDCP-C and RRC) in a different CU with respect to the centralized UP protocols (e.g., PDCP-U).

It has also been agreed in 3GPP to support a separation of gNB-CU into a CU-CP function (including RRC and PDCP for signaling radio bearers) and CU-UP function (including PDCP for UP). The CU-CP and CU-UP functions can communicate with each other using the E1-AP protocol over the E1 interface. In addition to the new E1 interface, the F1 interface can be logically separated into CP (F1-C) and UP (F1-U) functionalities. The following scenarios for the split CU-UP/CP are defined in 3GPP TR 38.804:

CU-CP and CU-UP centralized;

CU-CP distributed and CU-UP centralized; and

CU-CP centralized and CU-UP distributed.

As mentioned above, an RRC_CONNECTED UE can be configured by the network to perform measurements and, upon triggering measurement reports, the network may send a handover command to the UE. In LTE, this command is an RRConnection-Reconfiguration message with a mobilityControlInfo field. In NR, this command is an RRCReconfiguration message with a reconfigurationWithSync field.

These reconfigurations are prepared by the handover target mode upon a request from the source node, exchanged over X2 or S1 interface in LTE (see, e.g., FIG. 1) or NG interface in case of NR (see, e.g., FIG. 3). These reconfigurations typically take into account the existing RRC configuration between the UE and the source cell, which is provided in the inter-node request. In LTE, for example, this existing UE configuration is provided in the HandoverPreparationInformation information element (IE) of the handover request from the source node to the target node. In response, the target node provides reconfiguration parameters that contain all information the UE needs to access the target cell, e.g., random access configuration, a new C-RNTI assigned by the target cell, security parameters enabling the UE to calculate new security keys associated with the target cell, etc. The new security keys enable the UE to send a handover complete message on SRB1, which is encrypted and integrity protected, upon accessing the target cell. In LTE, the However, this handover (HO) process has various problems when used to handover UEs that are currently utilizing applications that are data-intensive (e.g., video streaming) or delay-sensitive (e.g., packet voice). For example, the existing UE configuration currently provided by the source node may be insufficient for the target node to make informed decisions regarding handover admission of such data-intensive or delay-sensitive UEs.

Figure 4A:
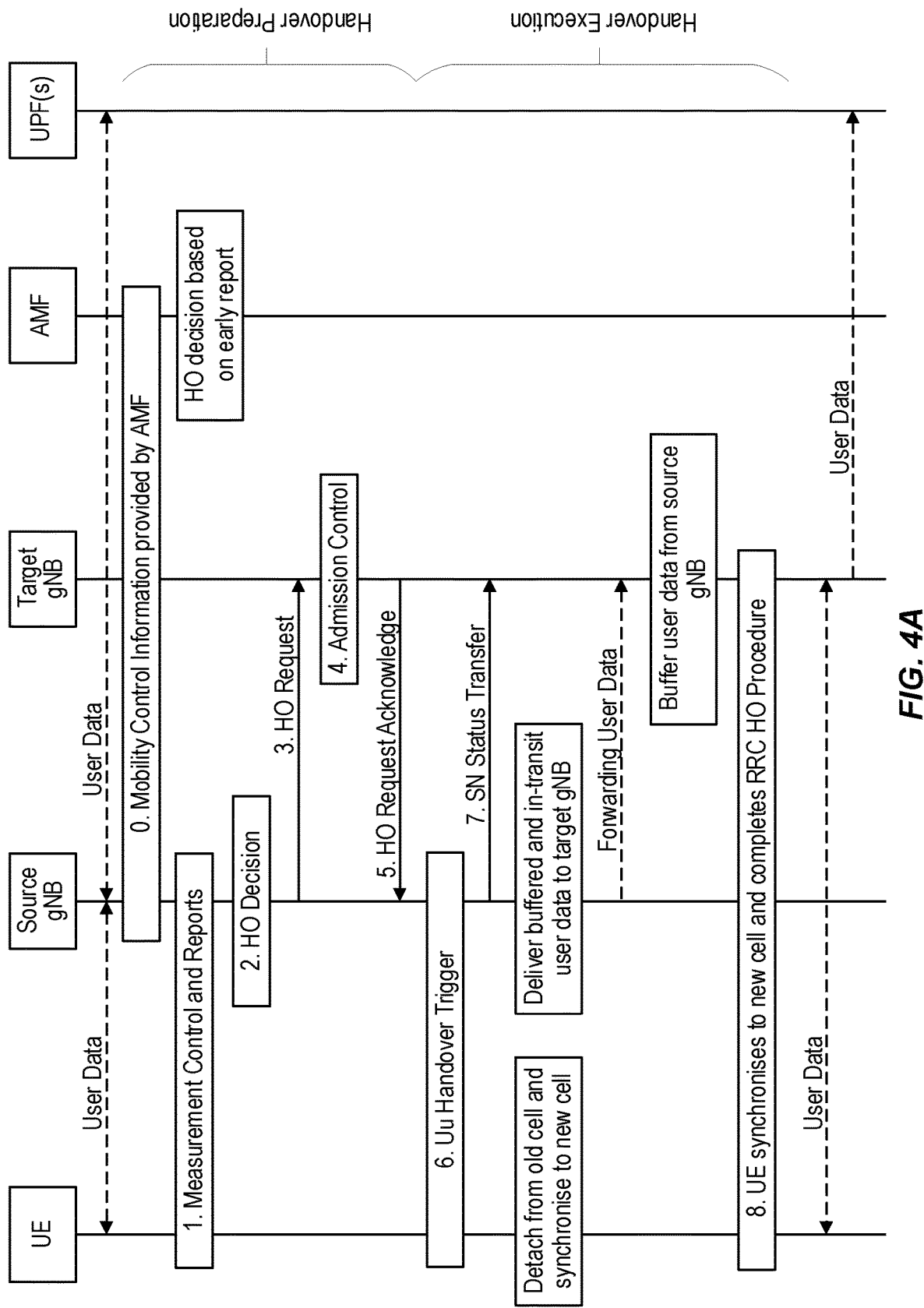
FIGS. 4A and 4B, illustrates an exemplary signalling flow between a UE, a source node (e.g., source gNB), and a target node (e.g., target gNB) during a handover procedure in a 5G/NR network.
Figure 4B:
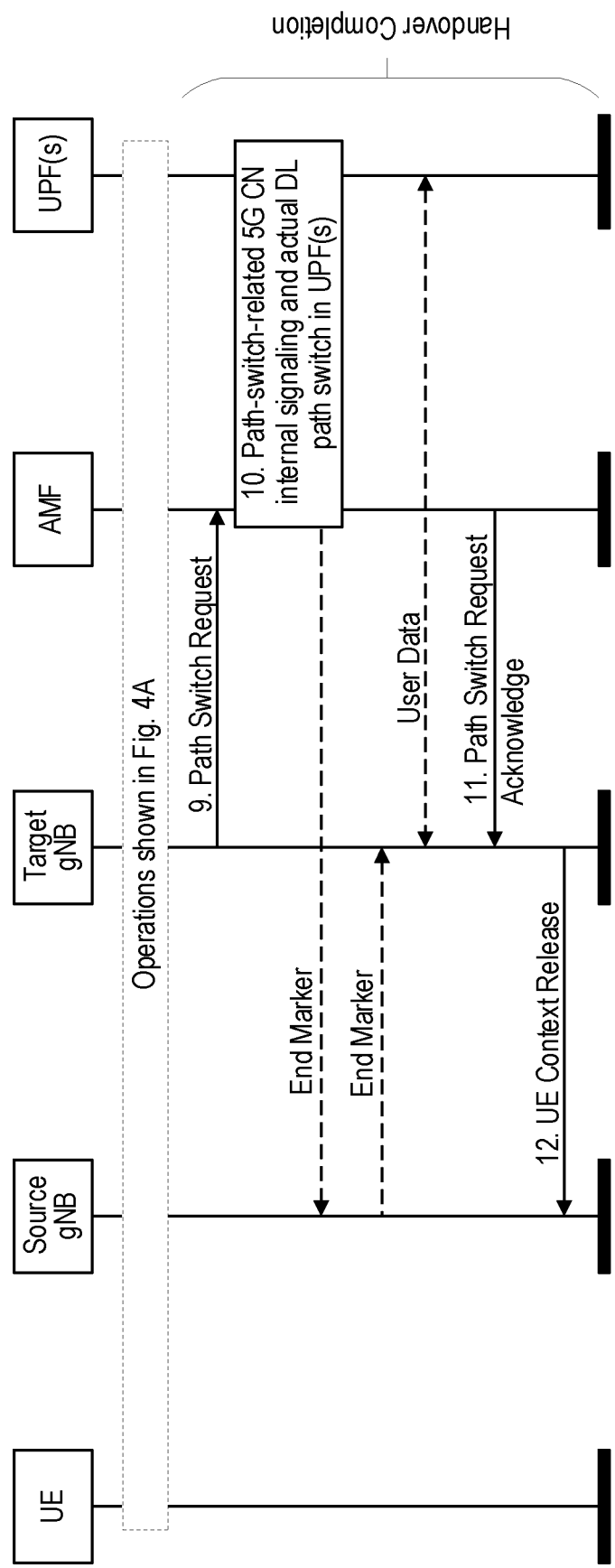

FIG. 4, which is divided in to FIGS. 4A and 4B, illustrates the signalling flow between a UE, a source node (e.g., source gNB), and a target node (e.g., target gNB) during a handover procedure in an NR network. FIG. 4 also illustrates the roles of 5GC functions including access management function (AMF) and user-plane function (UPF). Even so, the following discussion addresses various principles related to HO (or more generally, UE mobility while in RRC_CONNECTED mode) in both NR and LTE networks.

First, UE mobility in RRC_CONNECTED is network-based, since the network has the most recent and/or most accurate information regarding current situation such as load conditions, resources in different nodes, available frequencies, etc. The network can also take into account the situation of many UEs in the network, from a resource allocation perspective.

As illustrated in FIG. 4, there are three phases to the handover procedure: handover preparation, handover execution, and handover completion. During the handover preparation phase, the network prepares a target cell before the UE accesses that cell. The source node receives measurement reports from the UE (operation 1), makes a handover decision based on these reports (e.g., operation 2), and negotiates a handover of the UE with the target node (e.g., operations 3-5).

During handover execution, the source node provides the UE with various information to trigger handover to a target cell served by the target node (operation 6), and also provides the target node with the UE's current status in the source node (operation 7). For example, the source node (e.g., in operation 6) provides the UE with the RRC configuration to be used in the target cell, including SRB1 configuration (e.g., parameters from which to derive keys for encryption/integrity protection) to send the HO complete message (e.g., RRCConnection-ReconfigurationComplete). The source node provides the UE with a target C-RNTI, so that the target node can identify the UE from random-access msg3 on MAC level for the HO complete message. This information is received from the target node during the handover preparation phase. Accordingly, unless a failure occurs, there is no need for the target node to perform UE context fetching.

Furthermore, to speed up the HO, the source node provides the UE with needed information on how to access the target (e.g. RACH configuration), so the UE does not have to acquire target node system information (SI, e.g., from broadcast) prior to the handover. Both full and delta reconfiguration are supported so that the HO command can be minimized. The UE may be provided with contention-free random-access (CFRA) resources; in that case, the target node can identify the UE from the RACH preamble (also referred to as msg1). More generally, the normal HO procedure can always be optimized with dedicated resources, such as CFRA resources.

Also during the handover execution phase, the UE detaches from the old cell (e.g., served by the source node) and synchronises to the new cell served by the target node (e.g., operation 8). Concurrent with these operations, the source node delivers buffered user data for the UE to the target node, which can subsequently communicate this user data to the UE after the UE completes the handover.

During the handover completion phase, the target node and the source node in the NG-RAN communicate with the 5GC (e.g., the AMF) to update the path information associated with the UE (e.g., operations 9 and 11). In addition, nodes or functions within the 5GC (e.g., AMF and UPF) can communicate to update the UE path based on the handover (e.g., operation 10). Finally, the target node can inform the source node that it can release the UE's context (e.g., operation 12).

As briefly discussed above, one of the main goals of NR is to provide more capacity for operators to serve ever-increasing traffic demands and variety of applications. Because of this, NR should be able to operate on high frequencies (over 6 GHz and up to 100 GHz), where more spectrum will be available. In comparison to the current frequency bands allocated to LTE, some of the new bands will have much more challenging propagation properties such as lower diffraction and higher outdoor/indoor penetration losses. As a consequence, signals have less ability to propagate around the corners and penetrate walls. In addition, atmospheric/rain attenuation and higher body losses make the coverage of NR signals in high frequency bands even spottier. Fortunately, operation in higher frequencies makes it possible to use smaller antenna elements, which enables antenna arrays with many antenna elements. Such antenna arrays facilitate beamforming, where multiple antenna elements are used to form narrow beams and thereby compensate for the challenging propagation properties.

Despite the link budget gains provided by beamforming solutions, reliability of a system purely relying on beamforming and operating in higher frequencies might be challenging, since the coverage might be more sensitive to both time/frequency and space variations. Consequently, the SINR of such narrow links can drop much quicker than in the case of LTE. Already in LTE, 3GPP RAN2 WG has observed that the serving cell may not be able to convey the HO command timely. Lowering the Time-To-Trigger (TTT) and the measurement hysteresis can reduce the handover failure rate but can also increase ping-pong probability (e.g., bouncing between cells). These effects are expected to be even more pronounced when operating at higher frequency bands of NR.

Accordingly, there is a need to improve mobility robustness in NR systems, and work items for mobility enhancements in LTE and NR have started in 3GPP in Rel-16. The main objectives of the work items are to improve the robustness at handover and to decrease the interruption time at handover.

In LTE and NR, different solutions to increase mobility robustness have been discussed in the past. One solution is based on Dual Connectivity (DC) introduced in LTE Rel-12. In DC, the UE is connected to two network nodes simultaneously. This improves mobility robustness by serving control plane traffic (e.g. used for measurement reporting and handover command) by a robust macro layer at lower frequency and providing capacity boost with higher frequencies. This feature is often referred to as "UP/CP split." Alternately, DC can be configured as RRC diversity, i.e., sending control plane signaling via both connected nodes. This increases robustness due to the diversity in temporal and spatial domains.

One way to combat such failures is "conditional handover," briefly mentioned above. One type of conditional-handover solution discussed in 3GPP RAN2 WG is "early HO command" or "conditional HO command." In order to avoid the undesired dependence of the serving radio link upon the time (and radio conditions) when the UE should execute the handover, RRC signaling for the handover command can be provided earlier to the UE. In such case, the handover command can be associated with a condition that, once fulfilled, enables the UE to execute the handover in accordance with the provided handover command. An example condition could be that a neighbor cell becomes X dB better than a source cell (e.g., based on a particular signal-strength metric), which is similar to a condition associated with an "A3" event.

Figure 5:
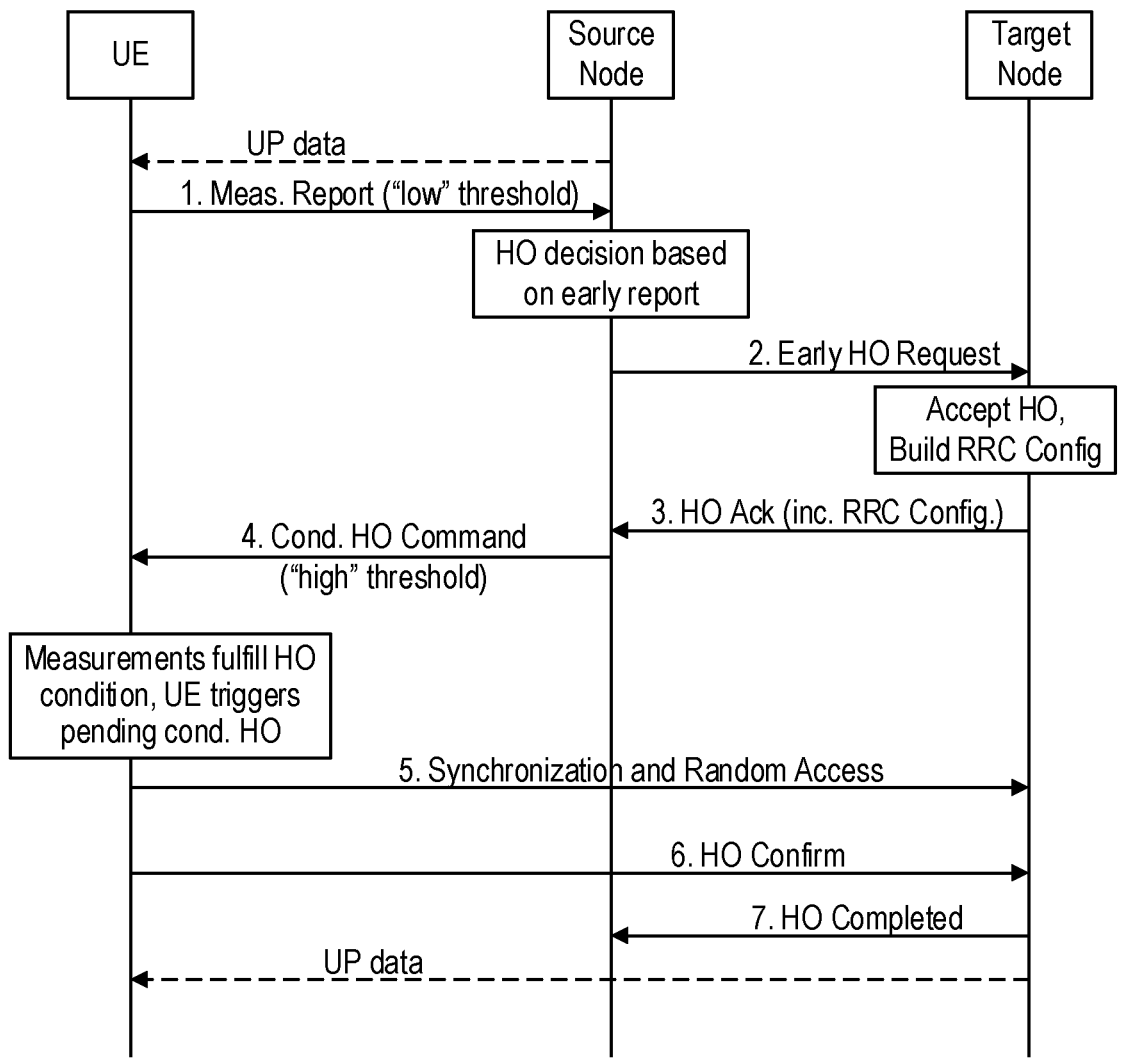
FIG. 5 shows a signalling flow of an exemplary conditional handover procedure involving a single serving cell and a single target cell.

FIG. 5 illustrates an exemplary signal flow between a user equipment (UE), a source node, and a target node for a conditional handover (HO), according to exemplary embodiments of the present disclosure. The serving and target network nodes can be, e.g., gNBs and/or components of gNBs, such as CUs and/or DUs.

This procedure involves two different measurement thresholds: a low threshold and a high threshold. The two thresholds can be expressed as different levels of a particular metric, e.g., signal strength, signal quality, etc. For example, the high threshold could be that the quality of the mobility RS (MRS) of the target cell or beam becomes X dB stronger than the MRS of the UE's serving cell (e.g., provided by the source node), with the low threshold being less than the high threshold (i.e., target exceeds source by lower amount). As used in this context, MRS denotes a reference signal used for any mobility-related purpose. For example, in NR, MRS can be either SSB (SS/PBCH block) or CSI-RS. As a further example, for NR operating in unlicensed spectrum (referred to as NR-U), MRS can be a discovery reference signal (DRS) in addition to any of the signals mentioned above.

The UE can be provided with a measurement configuration including the low threshold (not shown in the figure). Upon performing measurements that meet the low threshold, the UE can send a measurement report to the serving node (operation 1). While performing the measurements and evaluating the low threshold, the UE continues operating in its current RRC configuration. In operation 2, based on this report, the source node can decide to request an early handover of the UE to the target node (e.g., to a cell indicated in the measurement report). For example, this early handover request can include a HandoverPreparationInformation IE such as described above.

The target node performs admission control for the UE and responds with the handover acknowledgement (operation 3) that includes RRC configuration, similar to the basic handover shown in FIG. 4. In operation 4, the source node then sends the UE a "Conditional HO Command", which can include the high threshold. Upon receiving this command, the UE continues to perform measurements and whenever the high threshold condition is met, it can move to the target node and performs the handover (e.g., operations 5-7). Even so, the UE can remain in the serving cell (i.e., provide by the source node) for an extended amount of time in case the high threshold condition is not fulfilled.

This allows the serving cell to prepare the handover upon reception of an early measurement report and to provide the Conditional HO Command (e.g., RRCConnectionReconfiguration with mobilityControlInfo for LTE, or RRCReconfiguration with either a reconfigurationWithSync or a CellGroupConfig for NR) at a time when the radio link between the source cell and the UE is still relatively stable. The UE executes the handover at a later point in time (and threshold) that is optimal and/or preferred.

Although FIG. 5 shows an exemplary conditional handover involving a single serving cell and a single target cell, other scenarios may involve many cells or beams that the UE has reported as possible candidates based on its radio resource management (RRM) measurements. The network should have the freedom to issue conditional handover commands for any of those candidates. The Conditional HO Command for each of those candidates may differ, in terms of the HO execution condition (e.g., reference signal (RS) to measure, threshold to exceed, etc.) and/or in terms of the RA preamble to be sent when a condition is met.

Each Conditional HO Command (e.g., RRCConnectionReconfiguration or RRCReconfiguration message) is typically a "delta" to the UE's current configuration. LTE UEs apply RRCConnectionReconfiguration messages in the order in which they receive them. On the other hand, 3G UTRAN allowed associating a reconfiguration message with an "Activation Time". This led to race conditions and numerous problems when the UE receive a first reconfiguration with a longer activation time than the activation time of a subsequent reconfiguration message. As such, the LTE mechanism is simpler and more robust and is expected to be adopted also for NR. Moreover, "conditional handover" mechanism discussed above is expected to be developed to avoid similar problems as observed in UMTS.

U.S. Prov. Patent Appl. No. 62/446,822, assigned to the current Applicant, discusses problems associated with overriding an existing RRC reconfiguration message for a particular target cell with the latest RRC reconfiguration message from the same target cell. For example, this application discusses different ways of providing the updated RRC reconfiguration and the UE behavior upon such an update. PCT Publication WO2018/132051, also assigned to the current Applicant, discusses problems and corresponding solutions related to priority ordering of multiple cells for which a conditional handover command is sent to a UE.

When the UE receives a Conditional HO command (e.g., as shown in FIG. 5) it should interpret the corresponding RRC signaling as delta to its current configuration (unless it is a full configuration message). It may in principle determine the target configuration immediately upon reception of the command, but it shall apply/execute it only if the associated condition is fulfilled. While the UE evaluates the condition, it should continue operating according to its current RRC configuration without applying the conditional HO command. When the UE determines that the condition is fulfilled, it disconnects from the serving cell, applies the conditional HO command, and connects to the target cell.

These steps are substantially similar to the current, instantaneous handover execution. An alternative solution relies on UE context fetching, where a condition is also provided to the UE and, upon the fulfillment of the condition, the UE executes an RRC Resume procedure towards at least one target cell. In general, both conditional handover and this conditional resume procedure are examples of conditional mobility procedures, discussed herein.

In both NR and LTE, two inter-node messages are typically used in relation to HO. As briefly mentioned above, the HandoverPreparationInformation message is used to transfer the NR RRC information used by the target gNB during handover preparation, including UE capability information. When the source node decides to handover the UE, the source node provides the information in the HandoverPreparationInformation message to enable the target node to prepare an RRCReconfiguration (provided later in the HandoverCommand) that the UE can use in the target node upon handover execution.

FIG. 6 shows an exemplary ASN.1 data structure that describes the content of an NR HandoverPreparationInformation message. An LTE HandoverPreparation-Information message has similar content. Tables 1-2 below further specify certain fields listed in FIG. 6. Furthermore, the "cond HO" presence indicator means that the associated field is always present in case of handover within NR, optionally present in case of handover from E-UTRA connected to 5GC, and otherwise not present.

TABLE 1

| Field name | Description |
| --- | --- |
| as-Context | Local RAN context required by the target gNB. |
| sourceConfig | The radio resource configuration as used in the source cell. |
| rrm-Config | Local RAN context used mainly for RRM purposes. |
| ue-CapabilityRAT-List | UE radio access related capabilities concerning RATs supported by the UE. FFS whether certain capabilities are mandatory to provide by source e.g. of target and/or source RAT. |
| candidateCellInfoList | A list of the best cells on each frequency for which measurement information was available. |

TABLE 2

| Source RAT | NR capabilites | E-UTRA capabilities | MR-DC capabilities |
| --- | --- | --- | --- |
| NR | Included | May be included | May be included |
| E-UTRAN | Included | May be included | May be included |

As mentioned above, a HandoverCommand message is used to transfer the handover command as generated, by the target gNB, to the source gNB. FIG. 7 shows an exemplary ASN.1 data structure that describes the content of an NR HandoverCommand message.

One field that is already present in both NR and LTE HandoverPreparation-Information messages is ue-Inactive Time, which indicates the value of an inactivity timer associated with the UE. This timer is initiated and runs when 110 user plane packets have been exchanged between the UE and source node, and upon expiration, the source node releases default EPS bearer to save resources and the UE is forced to enter idle mode. Knowing the value of ue-InactiveTime can help the target node (e.g., target-eNB or T-eNB, target-gNB or T-gNB) to discard handover requests for UEs that are likely in the idle mode within a short period of time.

However, ue-InactiveTime does not help a target node decide a handover request for UEs that are actively exchanging user-plane packets via radio bearers, such as UEs that are currently utilizing data-intensive or delay-sensitive applications. For example, data-intensive UEs can require a considerable amount of data buffer space on the target node if handover is admitted. The target node must reserve these resources against other uses, e.g., by other UEs. This resource reservation is particularly acute during conditional HO, when the target cell must reserve the radio resources for a considerably longer time than during normal (non-conditional) handover. Given fixed total resources, this longer reservation of significant resources for conditional HO of data-intensive UEs can significantly limit the target node's ability to serve other traffic.

Exemplary embodiments of the present disclosure address these and other problems, challenges, and/or issues by providing specific enhancements and/or improvements to mobility robustness in wireless communication networks. In general, exemplary embodiments include techniques and/or mechanisms that enable a target node to determine whether to admit the handover of a data-intensive and/or delay-sensitive UE, and to determine what techniques should be used to facilitate the handover while meeting the data throughput and/or delay requirements of that particular UE.

More specifically, in exemplary embodiments, a source or serving node (e.g., S-eNB, S-gNB) for a UE can provide a target node (e.g., T-eNB, T-gNB) for the UE handover with additional information about the UE characteristics. This additional information can include, e.g., UE buffer status, UE activity timer (e.g., indicating the time UE has been in connected mode), required UE data rate, and UE QoS class indicator (QCI). Based on this information, the target node can determine whether to admit the UE for handover, whether to activate bi-casting for an admitted UE, and (if activated) a particular bi-casting mode. The target node can inform the source node about the chosen bi-casting mode via a Handover Request Acknowledgement message containing the HandoverCommand for the source node to send to the UE.

In this manner, exemplary embodiments enable a network to make handover decisions more effectively, and to selectively and efficiently utilize bi-casting/multi-casting mechanisms for data-intensive and/or delay-sensitive UE. For example, networks deploying such embodiments would be able to provide more robust and/or substantially lossless handover, thereby improving, optimizing, and/or guaranteeing the quality of service (QoS) and/or quality of experience (QoE) for UEs during handovers to target cells.

Furthermore, these benefits can be provided without a significant increase in the amount of resources required by target nodes. In conditional HO, for example, UE active time, current UE data rate, and/or current UE buffer status can be leveraged to allocate a sufficient buffer at the target node to support the requirements of the UE that is conditionally admitted for later HO. This can be facilitated, for example, by selective bi-casting, i.e., sending the same user data to both source and target nodes during handover (or, more generally, multicasting in case of multiple target cells or nodes). Furthermore, this additional information related to the UE can be used by the target node to decide whether such bi-casting (or multi-casting) should originate from the source node or from the core network (e.g., a PGW in the EPC, a UPF in the 5GC, etc.). However, these techniques are not limited to conditional handover and can be applied to conventional handover to achieve most, if not all, of the same benefits and/or improvements.

In some exemplary embodiments, the source node can send the ue-BufferStatus information to the target node when requesting for handover for the UE. For example, the ue-BufferStatus can be sent as part of an existing RRM-Config information element (IE) included in the Handover-PreparationInformation message. In some embodiments, the ue-BufferStatus can provide an indication of the average amount of data to be sent to the UE during a fixed amount of time (e.g., X Mbits in Y seconds, where "Y" can be indicated explicitly or implicitly). In other embodiments, ue-BufferStatus can provide an indication of the total amount of data to be sent to the UE, e.g., a source node buffer size dedicated to UE traffic backlog not yet transmitted over the air. In yet other embodiments, ue-BufferStatus can provide an indication of the total amount of data (e.g., "X" Mbits) sent to the UE during the previous "Y" seconds (where "Y" can be indicated explicitly or implicitly).

In other exemplary embodiments, when requesting handover, the source node can send the ue-BufferStatus information to the target node together with other UE information such as ue-ActiveTime, ue-RequiredDataRate, and ue-QCI. For example, ue-ActiveTime contains the time duration that UE has been operating in connected mode. A larger value of ue-ActiveTime can indicate that the UE buffers are more likely to be in a steady state, while a smaller value can indicate protocol congestion mechanism may be in a start-up phase such that UE buffers have not yet saturated. As another example, ue-RequiredDataRate can indicate the required (or experienced) data rate of the UE based on the channel quality, transmission mode, and the service type associated with the UE and/or the source node. As yet another example, ue-QCI can indicate the type of the service and/or radio bearer required by the UE, e.g., whether a dedicated bearer for guaranteed bit rate (GBR) data is required or whether a default bearer would suffice.

The source node can represent ue-BufferStatus, ue-ActiveTime, ue-RequiredDataRate, and ue-QCI in various formats in the message sent to the target node. For example, any of the various parameters can be represents as integers corresponding to the actual values (e.g., an integer "X", where "X" represents the ue-BufferStatus in Mbits/second). Alternately, any of the parameters can be represented as indices that reference a subset of the possible parameter values, with the subset distributed uniformly or non-uniformly over the possible values.

FIG. 8 shows an exemplary ASN.1 data structure that describes the content of an RRM-Config IE of an LTE or NR HandoverPreparationInformation message, according to various exemplary embodiments of the present disclosure. More specifically, integer-valued fields ue-BufferStatus, ue-ActiveTime, ue-RequiredDataRate, and ue-QCI parameters are included in the RRM-Config IE shown in FIG. 8. This exemplary RRM-Config IE can replace the RRM-Config IE illustrated in FIG. 6.

In other embodiments, after receiving such UE characteristics (such as ue-BufferStatus, ue-ActiveTime, ue-RequiredDataRate, and/or ue-QCI), target node can base its admission control decision for the UE handover on the received characteristics together with the target cell/node available resources (e.g., free buffer space), target cell/node load (e.g., available transmission capacity), required QoS for UEs currently served by the target, etc. Based on this information, the UE can determine: 1) whether to admit or reject the UE handover; 2) upon a determination to admit, whether bicasting is necessary and/or desirable; and 3) the type of bicasting mechanism to be used.

For example, if the ue-BufferStatus is less than the target node free buffer space, the target node can determine to admit the UE handover. In addition, or in the alternative, a relation between the ue-RequiredDataRate and the target cell available transmission capacity can be used in the handover admission determination. Other relations between the received UE characteristics and current target cell/node operational conditions can also be used in the determination.

As another example, if ue-ActiveTime>$Thr_{[sec]}$ and ue-RequiredDataRate>$Thr_{[bps]}$, the target node can determine to activate bicasting to the UE during an admitted handover. For example, the requirement ue-RequiredDataRate>$Thr_{[bps]}$ can correspond to a data-intensive UE, and the requirement the ue-ActiveTime>$Thr_{[sec]}$ can correspond to UE buffer requirements (e.g., as expressed by ue-BufferStatus) having reached a substantially steady state.

Alternately, ue-QCI can be used in the bicasting activation determination for UEs that are utilizing delay-sensitive services and/or applications. Conventionally, when a UE moves to a target cell, it may require 200-300 ms to forward the UE's DL data to target cell. This can cause unacceptable degradation in some delay-sensitive services such as packet voice, real-time gaming, etc. As defined in 3GPP standards, each possible value of ue-QCI can be associated with a packet error loss rate and a packet delay budget. Delay-sensitive services can be assigned a QCI with an appropriate packet delay budget. For example, if the packet delay budget associated with ue-QCI is less than $Thr_{[delay]}$, the target node can determine to activate bicasting to the UE during an admitted handover. In other words, this threshold requirement can correspond to a delay-sensitive UE. By activating bicasting in this manner, the network can reduce and/or eliminate the degradation experienced with the conventional approach.

If bicasting is determined to be activated, the target node can also select the type or mode of bicasting to be used. In the case of an LTE network such as shown in FIG. 1, if the sum of ue-RequiredDataRate and the current load on the S1 interface with EPC (supporting currently served UEs) is less than the maximum S1 data rate, then the target node can determine to activate bi-casting over the S1 interface. In other words, ue-RequiredDataRate must be less than or equal to an available data rate on the S1 interface. In the case of an NR network such as shown in FIG. 3, this determination can be made with respect to the NG interface.

Figure 9:
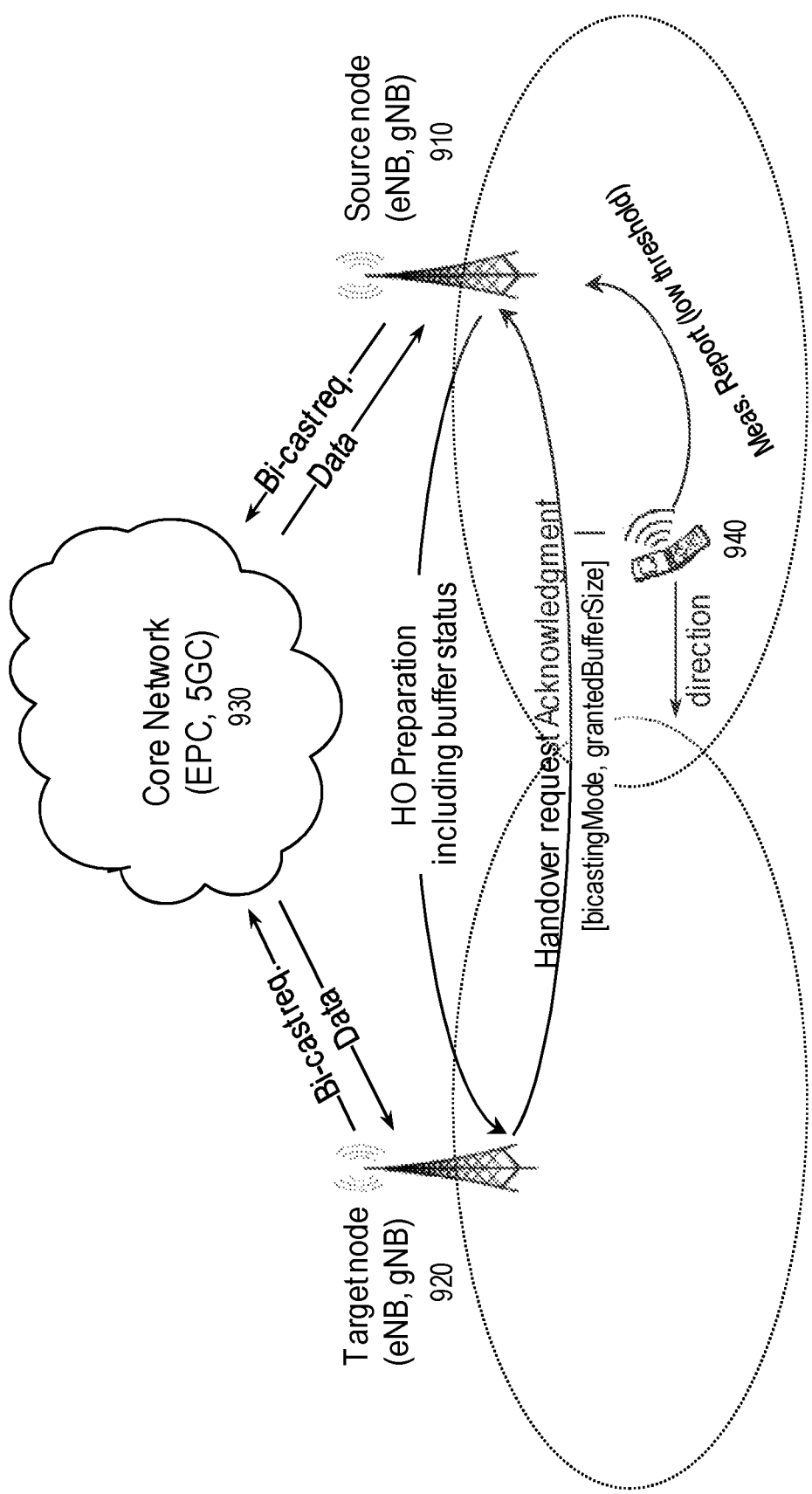
FIG. 9 shows a diagram of an exemplary network in which core network bicasting is activated for a UE involved in a mobility operation (e.g., conditional handover) from a source node to a target node, in accordance with certain exemplary embodiments of the present disclosure.

FIG. 9 shows a diagram of an exemplary network in which core network bicasting (e.g., via S1 or NG) is activated for a UE 940 being handed over (conditionally) from a source node 910 (e.g., eNB or gNB) to a target node 920 (e.g., eNB or gNB). Similar to the arrangement shown in FIG. 5, the UE can send a measurement report to the source node based on performing measurements that meet a previously-configured low threshold. For example, this can occur when the UE is moving in a direction from the source node towards the target node. In response, the source node can initiate initiate an early HO request of the UE to the target node (e.g., according to operation 2 in FIG. 5) by sending the HandoverPreparationInformation to the target node (labelled "HO Preparation" in FIG. 9).

As shown in FIG. 9, either the source node or the target node can request core network 930 (e.g., EPC, 5GC) to initiate bicasting during the handover (e.g., with a "Bi-cast req." message as shown in the figure). The target node can make the request directly after determining that S1 or NG bicasting should be activated. Alternately, the target node can indicate to the source node (e.g., via Handover Request Acknowledgement message containing the HandoverCommand) that the source node should request core network activation of S1 or NG bicasting. Upon bicasting activation, data buffered for the UE in the core network is delivered to both source node 910 and target node 920 for transmission to the UE during handover.

In either case, the core network bicasting request can also identify a starting position, within the buffered data, for bicasting to the target node. For example, this starting position can correspond to a data pointer used in a protocol layer between the core network and the UE. As a more specific example, the Transmission Control Protocol (TCP) sequence number can be included in the bicasting request as an indicator of the bicasting starting position for the LE. The TCP sequence number identifies an initial byte of a particular segment of a data stream from the sending TCP node (e.g., the SCOW) to the receiving TCP node (e.g., the UE) TCP sequence number of the next segment is incremented by the amount (e.g., bytes) of data contained in the previous segment.

TCP also includes an "Acknowledgement Number" field by which the sending TCP node informs the receiving TCP node of the next sequence number within the data stream from the receiving node (i.e., in the opposite direction) that the sending node is expecting to receive. In addition, the Acknowledgement Number value implicitly indicates that the sending node has correctly received bytes with sequence numbers up to, but not including, that value. As an example, the UE will send the source node TCP Acknowledgement Numbers with respect to downlink data from the network. TCP Acknowledgement Numbers can be used in various embodiments, as explained in more detail below.

Returning to the discussion of bicasting mode, if bicasting is determined to be activated and the sum of ue-RequiredDataRate and the current load on the LTE S1 interface (supporting currently served UEs) is greater than the maximum S1 data rate, then the target node can determine to activate bi-casting over the X2 interface with the source node. In other words, ue-RequiredDataRate must be less than an available capacity on the LTE S1 interface. In the case of an NR network such as shown in FIG. 3, the target node can determine to activate bicasting over the NG interface or the Xn interface in a similar manner.

Figure 10:
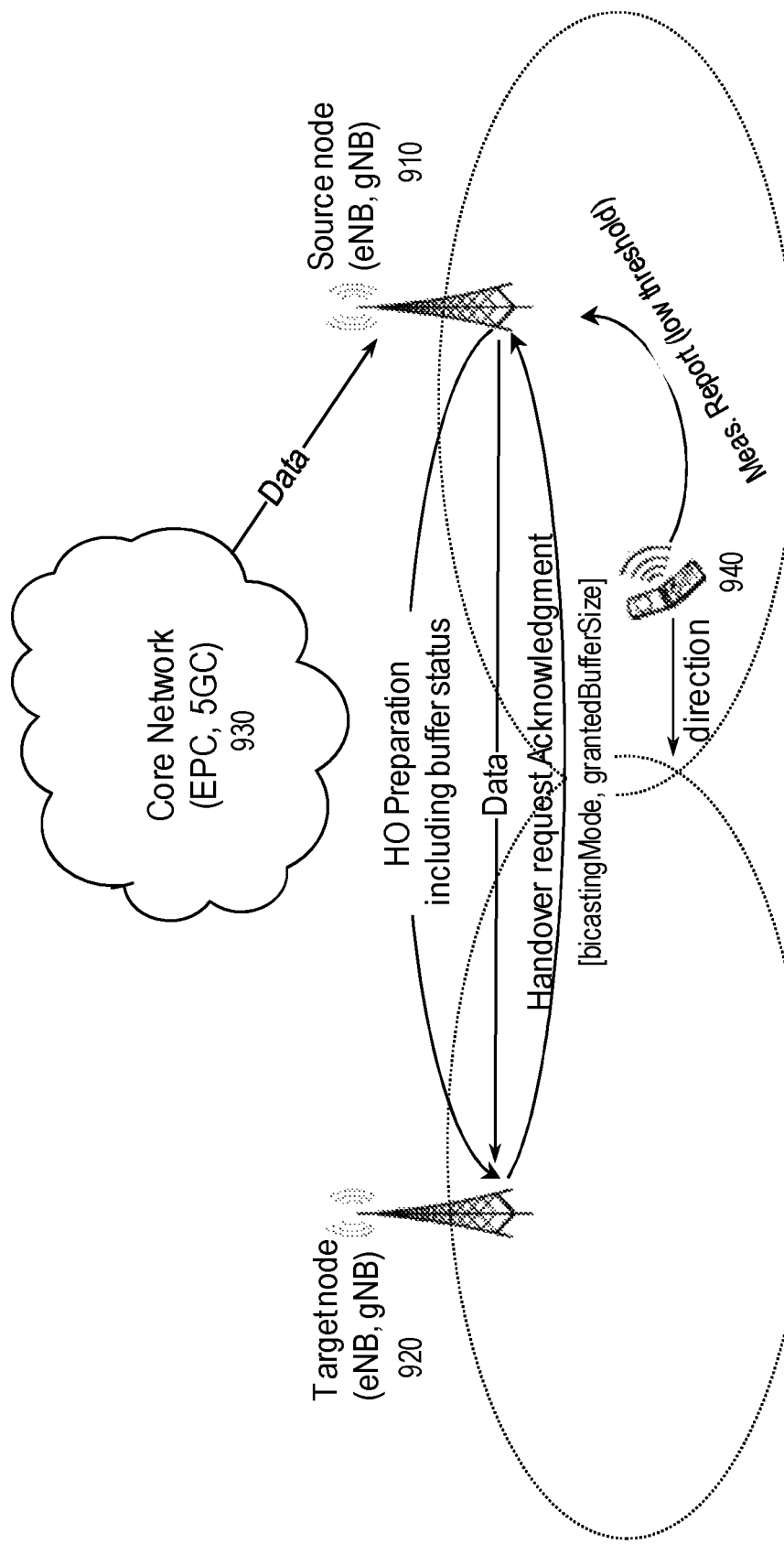
FIG. 10 shows a diagram of an exemplary network in which source node bicasting is activated for a UE involved in a mobility operation (e.g., conditional handover) from a source node to a target node, in accordance with certain exemplary embodiments of the present disclosure.

FIG. 10 shows a diagram of an exemplary network in which source node bicasting is activated for a UE 940 involved in a mobility operation (e.g., conditional handover) from source node 910 to target node 920. Descriptions of features in FIG. 10 that are identical or similar to features in FIG. 9 are omitted for the sake of brevity. One difference is that in the arrangement shown in FIG. 10, there is no need for communication between the target node 920 and core network 930 with respect to bicasting. Rather, the target node can indicate (e.g., via Handover Request Acknowledgement containing the HandoverCommand) that the source node should activate bicasting to the target node over the X2 or Xn interface, as the case may be.

In the arrangements shown in FIGS. 9-10, the target node can include a parameter bicastingMode in the Handover Request Acknowledgement to inform the source node of the selected bicasting mode. For example, bicastingMode=1 can be used to indicate that the source node should bicast the UE downlink (DL) traffic to the target node over over the X2/Xn interface, and bicastingMode=0 can be used to indicate that the source node should request the core network to bicast the UE DL traffic to the target node over over the S1/NG interface. In addition to the bicastingMode parameter, the target node can include a grantedBufferSize parameter that indicates the buffer size allocated for the UE within the target node.

Based on the grantedBufferSize received from the target node, the source node can determine how frequently it needs to inform the target node about DL data that has been successfully received by the UE. Based on this information, the target node can determine that it no longer needs to retain the bicasted data that was successfully received, thereby freeing up the corresponding portion of the grantedBufferSize for subsequent bicasted data. In general, however, the source node needs to inform the target node only when the bicasted DL packets in the target node reach, or approach, the grantedBufferSize.

The source node can inform the target node of correctly received DL data in various ways. In some embodiments, the source node can send the TCP Acknowledgement Number that it most recently received from the UE, which indicates that the UE has successfully received TCP sequence numbers up to but not including that value. In other embodiments, if the PDCP layer is used in the data delivery to the UE, the source node can send the PDCP Sequence Number that it most recently received from the UE. The PDCP Sequence number can be used to indicate the most recent data block and/or segment that was successfully received by the UE.

The target node can represent grantedBufferSize in various formats in the message sent to the source node. For example, grantedBufferSize can be represents as an integer corresponding to the actual values (e.g., an integer "X", where "X" represents the grantedBufferSize in kbytes). Alternately, grantedBufferSize can be represented as an index that references a subset of the possible parameter values, with the subset distributed uniformly or non-uniformly over the possible values.

FIG. 11 shows an exemplary ASN.1 data structure that describes the content of an NR HandoverCommand message sent from a target node to a source node, according to various exemplary embodiments of the present disclosure. In these illustrated embodiments, an integer-valued grantedBufferSize parameter and a binary-valued bicastingMode parameter are included in the message. A similar ASN.1 data structure can be used to specify an LTE HandoverCommand message that includes these parameters.

In other embodiments, a target node for UE handover can blindly determine a bicasting mechanism based on available target-node resources without reliance on certain UE characteristics. For example, the source node can inform the target node (e.g., via the HandoverPreparationInformation message) of a TCP socket from which the UE's DL data originates. The target node can then listen to this socket for some period of time to determine and/or observe characteristics of the DL data, and then make the bicasting determination based on these observed characteristics.

In general, exemplary embodiments are often described herein as being performed in NR or LTE networks. For example, the configuration of a UE conditional HO is received in an NR network and executed in an NR network. However, exemplary embodiments are also applicable to inter-RAT conditional mobility, such as:
  UE is configured with a conditional HO in NR, then the condition is triggered and UE executes the HO in LTE;
  UE is configured with a conditional HO in LTE, then the condition is triggered and UE executes the HO in NR; or In more general terms, UE is configured with a condition HO in RAT-1, then the condition is triggered and UE executes the HO in RAT-2.

Many of the UE (and network) operations are described herein in terms of handover or reconfigurations with synchronization (sync), which may include a cell change. However, exemplary embodiments are also applicable to situations where a cell is added, e.g., multi-connectivity scenarios such as carrier aggregation (CA), dual connectivity (DC), multi-RAT dual connectivity, etc. In such cases, a conditional mobility configuration may be for SCG addition, SCell addition, etc.

Exemplary embodiments are also applicable to intra-cell conditional mobility procedures, e.g. a reconfiguration with sync with cell identity the same as a serving cell. Furthermore, inter-node procedures and/or messages supporting conditional mobility may include any of the following:
  Inter-node intra-RAT intra-system, such as NR gNodeBs over Xn;
  Inter-node intra-RAT intra-system, such as ng-eNodeBs over Xn;
  Inter-node intra-RAT intra-system, such as LTE eNodeBs over X2;
  Inter-node inter-RAT intra-system, such as ng-eNodeBs and gNodeBs over Xn; or
  Inter-node inter-RAT inter-system, such as E-UTRAN and NG-RAN, i.e. gNodeBs/en-eNodeBs and eNodeBs over NG and S1.

These embodiments described above can be further illustrated with reference to FIGS. 12-13, which depict exemplary methods (e.g., procedures) performed by a candidate target node and by a source node, respectively. In other words, various features of the operations described below with reference to FIGS. 12-13 correspond to various embodiments described above.

Figure 12:
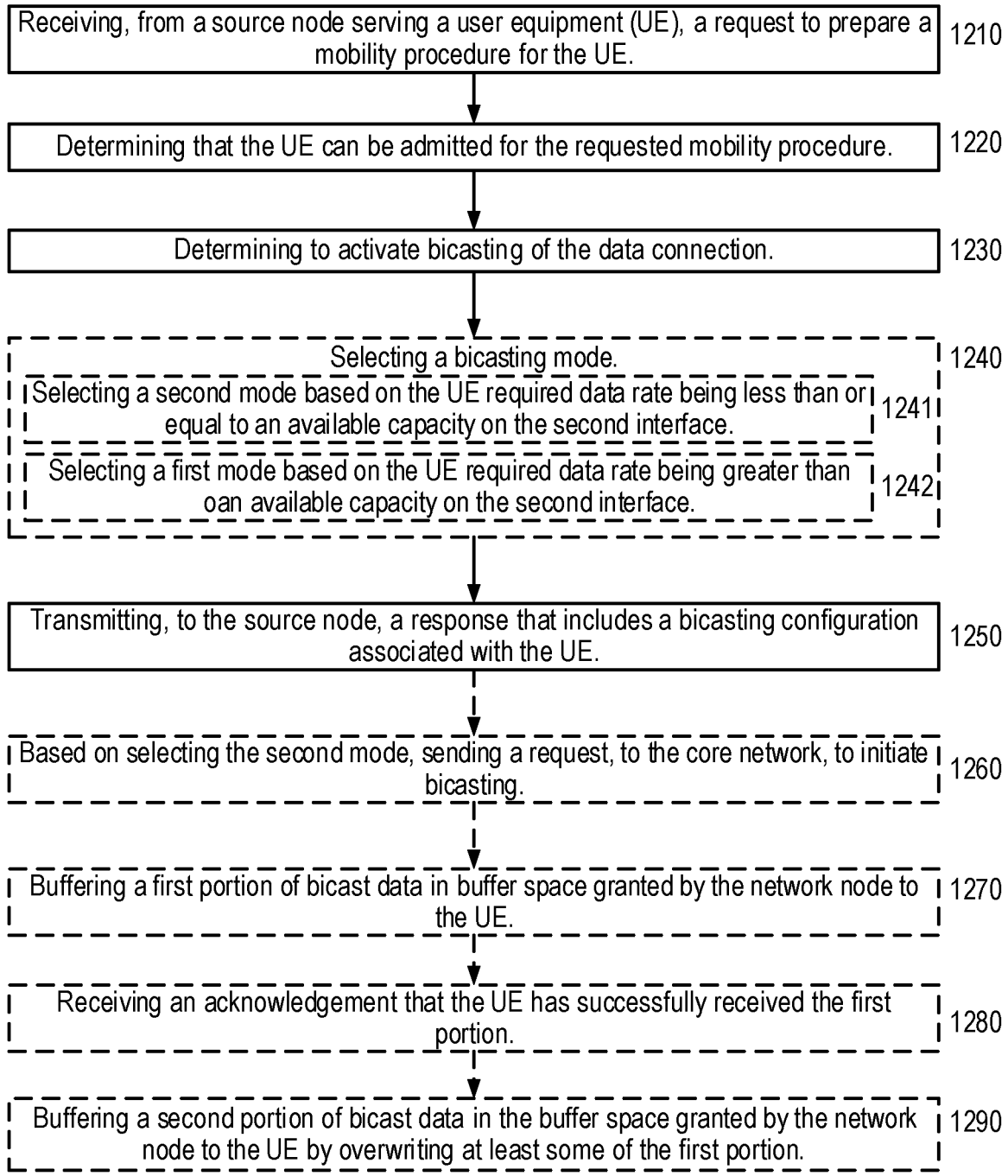
FIG. 12 illustrates an exemplary method (e.g., procedure) performed by a target node for a UE mobility operation a radio access network (RAN), according to various exemplary embodiments of the present disclosure.

More specifically, FIG. 12 is a flow diagram illustrating an exemplary method (e.g., procedure) performed by a network node in a RAN that is a target node candidate for a mobility operation of a UE, according to various exemplary embodiments of the present disclosure. For example, the exemplary method can be performed by a base station, eNB, gNB, etc. or component thereof in a RAN such as an E-UTRAN, NG-RAN, etc. Furthermore, the exemplary method shown in FIG. 12 can be used cooperatively with other exemplary methods described herein (e.g., FIG. 13) to provide various exemplary benefits and/or solutions to exemplary problems described herein. Although FIG. 12 shows specific blocks in a particular order, the operations corresponding to the blocks can be performed in different orders than shown and can be combined and/or divided into blocks and/or operations having different functionality than shown. Optional blocks and/or operations are indicated by dashed lines.

The exemplary method can include the operations of block 1210, where the target node can receive, from a source node serving the UE, a request to prepare a mobility procedure for the UE in relation to a candidate target cell associated with the network node. The request can include one or more characteristics associated with a data connection of the UE. For example, the one or more characteristics can include any of the following: status of a UE buffer at the source node; UE required data rate; UE connection active time; UE QoS class indicator, QCI; and Transmission Control Protocol, TCP, socket for the data connection. As a further example, the requested mobility procedure can include any of the following: handover, conditional handover, resume, re-establishment, reconfiguration with synchronization, beam switch, and secondary cell, SCell, addition.

The exemplary method can also include the operations of block 1220, where the target node can, based on the one or more characteristics, determine that the UE can be admitted for the requested mobility procedure. In some embodiments, determining that the UE can be admitted can be based on the status of the UE buffer at the source node being less than an amount of available buffer space associated with the network node. In some embodiments, determining that the UE can be admitted can be based on the UE required data rate being less than an available transmission capacity in the candidate target cell.

The exemplary method can also include the operations of blocks 1230 and 1250. In block 1230, the target node can determine to activate bicasting of the data connection. In block 1250, the target node can transmit, to the source node, a response that includes a bicasting configuration associated with the UE.

In some embodiments, determining to activate bicasting can be based on at least one characteristic of the data connection observed by listening to the originating TCP socket for the data connection. In some embodiments, determining to activate bicasting can be based on at least one of the following: the UE connection active time being greater than a first threshold, and the UE required data rate being greater than a second threshold. In some embodiments, determining to activate bicasting can be based on a delay budget associated with the UE QCI being less than a third threshold.

In some embodiments, the exemplary method can also include the operations of block 1240, where the target node can select a bicasting mode from a first mode and a second mode. For example, the first mode can be associated with with a first interface (e.g., X2, Xn) to the source node, and the second mode can be associated with a second interface (e.g., S1, NG) to a core network. In such embodiments, the bicasting configuration (e.g., transmitted in block 1250) can include an indication of the selected bicasting mode and an indication of a size of a buffer space granted by the network node to the UE.

In such embodiments, the operations of block 1240 can include the operations of sub-blocks 1241-1242. In sub-block 1241, the target node can select the second mode based on the UE required data rate being less than or equal to an available capacity on the second interface (e.g., S1, NG). In sub-block 1242, the target node can select the first mode based on the UE required data rate being greater than the available capacity on the second interface.

In some embodiments, the exemplary method can also include the operations of block 1260, where the target node can, based on selecting the second mode, send a request, to the core network, to initiate bicasting the data connection to the target node. In such embodiments, the request can include a bicast start position associated with a protocol layer used in the data connection. For example, the bicast start position can be a TCP sequence number.

In some embodiments, the exemplary method can also include the operations of block 1270, where the target node can buffer a first portion of bicast data in the buffer space granted by the network node to the UE. This buffering can occur, for example, in response to either the source node (e.g., according to the first mode) or the core network (e.g., according to the second mode) initiating the requested data bicast. In these embodiments, the exemplary method can also include the operations of block 1280, where the target node can receive an acknowledgement that the UE has successfully received the first portion. This acknowledgement can be received from the source node or the core network, according to the selected mode. In various embodiments, the acknowledgement can comprise a TCP Acknowledgement Number, a PDCP Sequence Number, or any other protocol-related parameter. In such embodiments, the exemplary method can also include the operations of block 1290, where the target node can, in response to the acknowledgement, buffer a second portion of bicast data in the buffer space granted by the network node to the UE by overwriting at least some of the first portion (i.e., that was previously buffered). In this manner, the network node can fulfil the requirements of data-intensive and/or delay-sensitive UEs during handover with a reasonable amount of buffer resources.

Figure 13:
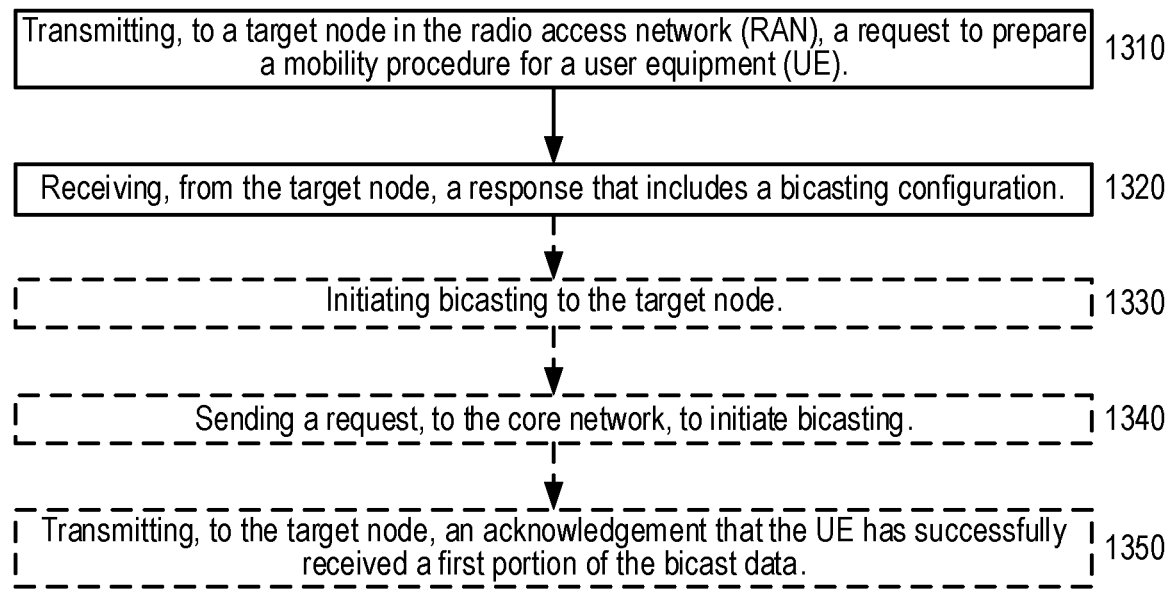
FIG. 13 illustrates an exemplary method (e.g., procedure) performed by a source node for a UE mobility operation a radio access network (RAN), according to various exemplary embodiments of the present disclosure.

In addition, FIG. 13 is a flow diagram illustrating an exemplary method (e.g., procedure), performed by a source node in a RAN, for mobility of a UE served by the source node, according to various exemplary embodiments of the present disclosure. For example, the exemplary method shown in FIG. 13 can be performed by a base station, eNB, gNB, etc. or component thereof in a RAN such as an E-UTRAN, NG-RAN, etc. Furthermore, the exemplary method shown in FIG. 13 can be used cooperatively with other exemplary methods described herein (e.g., FIG. 12) to provide various exemplary benefits and/or solutions to exemplary problems described herein. Although FIG. 13 shows specific blocks in a particular order, the operations corresponding to the blocks can be performed in different orders than shown and can be combined and/or divided into blocks and/or operations having different functionality than shown. Optional blocks and/or operations are indicated by dashed lines.

The exemplary method can include the operations of block 1310, where the source node can transmit, to a target node, a request to prepare a mobility procedure for the UE in relation to a candidate target cell associated with the target node. The request can include one or more characteristics associated with a data connection of the UE. For example, the one or more characteristics can include any of the following: status of a UE buffer at the source node; UE required data rate; UE connection active time; UE QoS class indicator, QCI; and Transmission Control Protocol, TCP, socket for the data connection. As a further example, the requested mobility procedure can include any of the following: handover, conditional handover, resume, re-establishment, reconfiguration with synchronization, beam switch, and secondary cell, SCell, addition.

The exemplary method can also include the operations of block 1320, where the source node can receive, from the target node, a response to the request, the response including a bicasting configuration associated with the UE. In some embodiments, the bicasting configuration can include an indication of a bicasting mode selected by the target node. The selected bicasting mode can be a first mode associated with with a first interface (e.g., X2, Xn) to the target node, or a second mode associated with a second interface (e.g., S1, NG) between the target node and a core network. The bicasting configuration can also include an indication of a size of a buffer space granted by the target node to the UE. For example, the indication can indicate the portion of a data buffer, comprising or associated with the target node, that is allocated to receive bicast data for the UE undergoing the mobility operation.

In some embodiments, the exemplary method can also include the operations of block 1330, where the source node can, based on the bicasting configuration indicating the first mode, initiating bicasting of the data connection to the target node via the first interface. In some embodiments, the exemplary method can also include the operations of block 1340, where the source node can, based on the bicasting configuration indicating the second mode, send a request, to the core network, to initiate bicasting of the data connection to the target node. The request can include a bicast start position associated with a protocol layer used in the data connection. For example, the bicast start position can be a TCP Sequence Number.

In some embodiments, the exemplary method can also include the operations of block 1350, where the source node can transmit, to the target node, an acknowledgement that the UE has successfully received a first portion of the bicast data via the source node. The size of the first portion can be less than the size of the buffer space granted by the target node to the UE. In various embodiments, the acknowledgement can include a TCP Acknowledgement Number, a PDCP Sequence Number, or any suitable protocol-related parameter. For example, the first portion can represent the amount of successfully-received data since the most recent acknowledgement (e.g., related to a previous portion) was transmitted by the source node to the target node.

Figure 14:
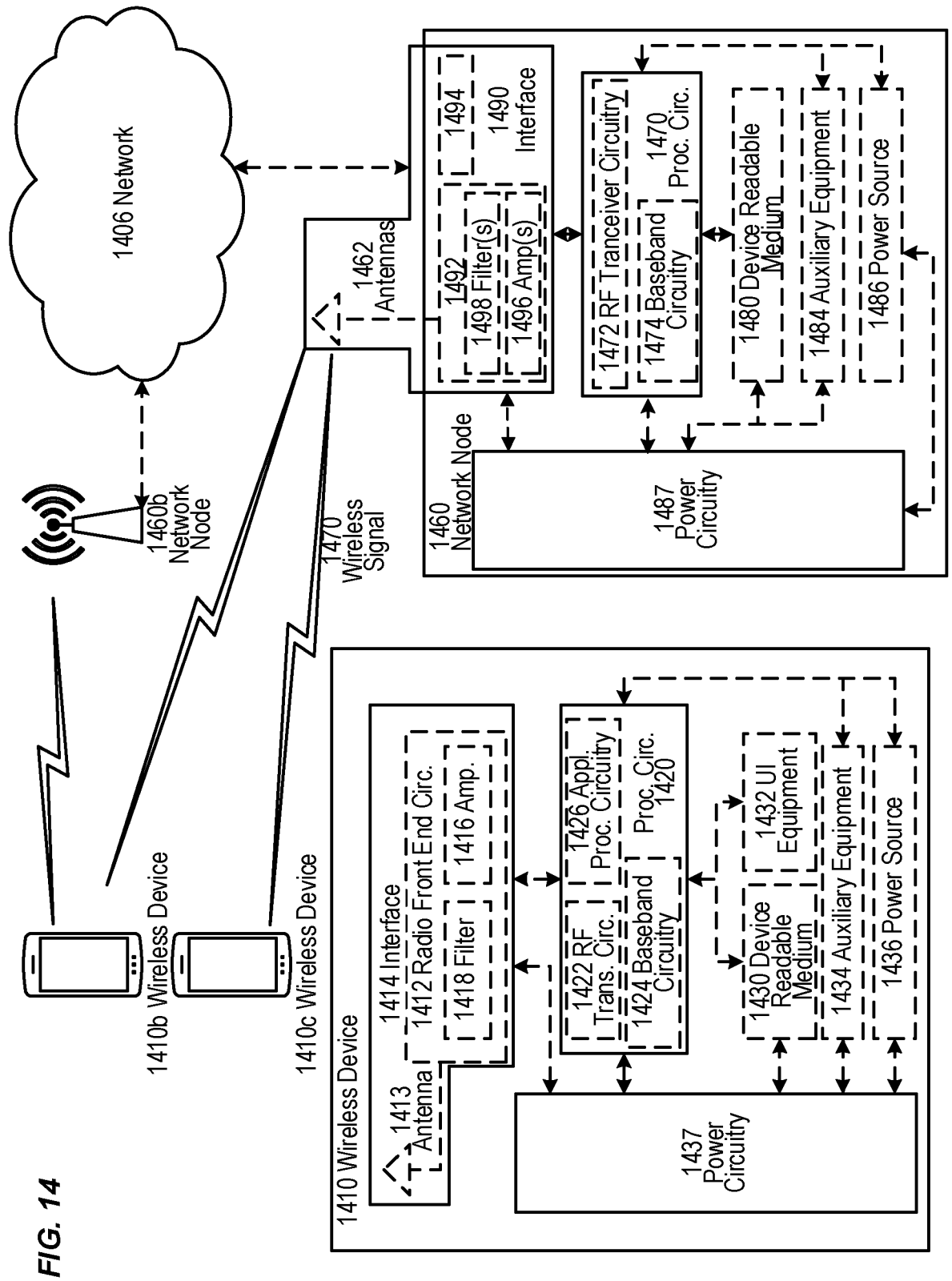
FIG. 14 illustrates an exemplary embodiment of a wireless network, in accordance with various aspects described herein.

Although the subject matter described herein can be implemented in any appropriate type of system using any suitable components, the embodiments disclosed herein are described in relation to a wireless network, such as the example wireless network illustrated in FIG. 14. For simplicity, the wireless network of FIG. 14 only depicts network 1406, network nodes 1460 and 1460b, and WDs 1410, 1410b, and 1410c. In practice, a wireless network can further include any additional elements suitable to support communication between wireless devices or between a wireless device and another communication device, such as a landline telephone, a service provider, or any other network node or end device. Of the illustrated components, network node 1460 and wireless device (WD) 1410 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1406 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1460 and WD 1410 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below.

In FIG. 14, network node 1460 includes processing circuitry 1470, device readable medium 1480, interface 1490, auxiliary equipment 1484, power source 1486, power circuitry 1487, and antenna 1462. Although network node 1460 illustrated in the example wireless network of FIG. 14 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1460 are depicted as single boxes located within a larger box, or nested within multiple boxes, in practice, a network node can comprise multiple different physical components that make up a single illustrated component (e.g., device readable medium 1480 can comprise multiple separate hard drives as well as multiple RAM modules).

Similarly, network node 1460 can be composed of multiple physically separate components (e.g., a NodeB component and a RNC component, or a BTS component and a BSC component, etc.), which can each have their own respective components. In certain scenarios in which network node 1460 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1460 can be configured to support multiple radio access technologies (RATs). In such embodiments, some components can be duplicated (e.g., separate device readable medium 1480 for the different RATs) and some components can be reused (e.g., the same antenna 1462 can be shared by the RATs). Network node 1460 can also include multiple sets of the various illustrated components for different wireless technologies integrated into network node 1460, such as, for example, GSM, WCDMA, LTE, NR, WiFi, or Bluetooth wireless technologies. These wireless technologies can be integrated into the same or different chip or set of chips and other components within network node 1460.

Processing circuitry 1470 can be configured to perform any determining, calculating, or similar operations (e.g., certain obtaining operations) described herein as being provided by a network node. These operations performed by processing circuitry 1470 can include processing information obtained by processing circuitry 1470 by, for example, converting the obtained information into other information, comparing the obtained information or converted information to information stored in the network node, and/or performing one or more operations based on the obtained information or converted information, and as a result of said processing making a determination.

Processing circuitry 1470 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 1460, either alone or in conjunction with other network node 1460 components (e.g., device readable medium 1480). Such functionality can include any of the various wireless features, functions, or benefits discussed herein.

For example, processing circuitry 1470 can execute instructions stored in device readable medium 1480 or in memory within processing circuitry 1470. In some embodiments, processing circuitry 1470 can include a system on a chip (SOC). As a more specific example, instructions (also referred to as a computer program product) stored in medium 1480 can include instructions that, when executed by processing circuitry 1470, can configure network node 1460 to perform operations corresponding to various exemplary methods (e.g., procedures) described herein.

In some embodiments, processing circuitry 1470 can include one or more of radio frequency (RF) transceiver circuitry 1472 and baseband processing circuitry 1474. In some embodiments, radio frequency (RF) transceiver circuitry 1472 and baseband processing circuitry 1474 can be on separate chips (or sets of chips), boards, or units, such as radio units and digital units. In alternative embodiments, part or all of RF transceiver circuitry 1472 and baseband processing circuitry 1474 can be on the same chip or set of chips, boards, or units In certain embodiments, some or all of the functionality described herein as being provided by a network node, base station, eNB or other such network device can be performed by processing circuitry 1470 executing instructions stored on device readable medium 1480 or memory within processing circuitry 1470. In alternative embodiments, some or all of the functionality can be provided by processing circuitry 1470 without executing instructions stored on a separate or discrete device readable medium, such as in a hard-wired manner. In any of those embodiments, whether executing instructions stored on a device readable storage medium or not, processing circuitry 1470 can be configured to perform the described functionality. The benefits provided by such functionality are not limited to processing circuitry 1470 alone or to other components of network node 1460, but are enjoyed by network node 1460 as a whole, and/or by end users and the wireless network generally.

Device readable medium 1480 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1470. Device readable medium 1480 can store any suitable instructions, data or information, including a computer program, software, an application including one or more of logic, rules, code, tables, etc. and/or other instructions capable of being executed by processing circuitry 1470 and, utilized by network node 1460. Device readable medium 1480 can be used to store any calculations made by processing circuitry 1470 and/or any data received via interface 1490. In some embodiments, processing circuitry 1470 and device readable medium 1480 can be considered to be integrated.

Interface 1490 is used in the wired or wireless communication of signalling and/or data between network node 1460, network 1406, and/or WDs 1410. As illustrated, interface 1490 comprises port(s)/terminal(s) 1494 to send and receive data, for example to and from network 1406 over a wired connection. Interface 1490 also includes radio front end circuitry 1492 that can be coupled to, or in certain embodiments a part of, antenna 1462. Radio front end circuitry 1492 comprises filters 1498 and amplifiers 1496. Radio front end circuitry 1492 can be connected to antenna 1462 and processing circuitry 1470. Radio front end circuitry can be configured to condition signals communicated between antenna 1462 and processing circuitry 1470. Radio front end circuitry 1492 can receive digital data that is to be sent out to other network nodes or WDs via a wireless connection. Radio front end circuitry 1492 can convert the digital data into a radio signal having the appropriate channel and bandwidth parameters using a combination of filters 1498 and/or amplifiers 1496. The radio signal can then be transmitted via antenna 1462. Similarly, when receiving data, antenna 1462 can collect radio signals which are then converted into digital data by radio front end circuitry 1492. The digital data can be passed to processing circuitry 1470. In other embodiments, the interface can comprise different components and/or different combinations of components.

In certain alternative embodiments, network node 1460 may not include separate radio front end circuitry 1492, instead, processing circuitry 1470 can comprise radio front end circuitry and can be connected to antenna 1462 without separate radio front end circuitry 1492. Similarly, in some embodiments, all or some of RF transceiver circuitry 1472 can be considered a part of interface 1490. In still other embodiments, interface 1490 can include one or more ports or terminals 1494, radio front end circuitry 1492, and RF transceiver circuitry 1472, as part of a radio unit (not shown), and interface 1490 can communicate with baseband processing circuitry 1474, which is part of a digital unit (not shown).

Antenna 1462 can include one or more antennas, or antenna arrays, configured to send and/or receive wireless signals. Antenna 1462 can be coupled to radio front end circuitry 1490 and can be any type of antenna capable of transmitting and receiving data and/or signals wirelessly. In some embodiments, antenna 1462 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1462 can be separate from network node 1460 and can be connectable to network node 1460 through an interface or port.

Antenna 1462, interface 1490, and/or processing circuitry 1470 can be configured to perform any receiving operations and/or certain obtaining operations described herein as being performed by a network node. Any information, data and/or signals can be received from a wireless device, another network node and/or any other network equipment. Similarly, antenna 1462, interface 1490, and/or processing circuitry 1470 can be configured to perform any transmitting operations described herein as being performed by a network node. Any information, data and/or signals can be transmitted to a wireless device, another network node and/or any other network equipment.

Power circuitry 1487 can comprise, or be coupled to, power management circuitry and can be configured to supply the components of network node 1460 with power for performing the functionality described herein. Power circuitry 1487 can receive power from power source 1486. Power source 1486 and/or power circuitry 1487 can be configured to provide power to the various components of network node 1460 in a form suitable for the respective components (e.g., at a voltage and current level needed for each respective component). Power source 1486 can either be included in, or external to, power circuitry 1487 and/or network node 1460. For example, network node 1460 can be connectable to an external power source (e.g., an electricity outlet) via an input circuitry or interface such as an electrical cable, whereby the external power source supplies power to power circuitry 1487. As a further example, power source 1486 can comprise a source of power in the form of a battery or battery pack which is connected to, or integrated in, power circuitry 1487. The battery can provide backup power should the external power source fail. Other types of power sources, such as photovoltaic devices, can also be used.

Alternative embodiments of network node 1460 can include additional components beyond those shown in FIG. 14 that can be responsible for providing certain aspects of the network node's functionality, including any of the functionality described herein and/or any functionality necessary to support the subject matter described herein. For example, network node 1460 can include user interface equipment to allow and/or facilitate input of information into network node 1460 and to allow and/or facilitate output of information from network node 1460. This can allow and/or facilitate a user to perform diagnostic, maintenance, repair, and other administrative functions for network node 1460.

In some embodiments, a wireless device (WD, e.g., WD 1410) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1410 includes antenna 1411, interface 1414, processing circuitry 1420, device readable medium 1430, user interface equipment 1432, auxiliary equipment 1434, power source 1436 and power circuitry 1437. WD 1410 can include multiple sets of one or more of the illustrated components for different wireless technologies supported by WD 1410, such as, for example, GSM, WCDMA, LTE, NR, WiFi, WiMAX, or Bluetooth wireless technologies, just to mention a few. These wireless technologies can be integrated into the same or different chips or set of chips as other components within WD 1410.

Antenna 1411 can include one or more antennas or antenna arrays, configured to send and/or receive wireless signals, and is connected to interface 1414. In certain alternative embodiments, antenna 1411 can be separate from WD 1410 and be connectable to WD 1410 through an interface or port. Antenna 1411, interface 1414, and/or processing circuitry 1420 can be configured to perform any receiving or transmitting operations described herein as being performed by a WD. Any information, data and/or signals can be received from a network node and/or another WD. In some embodiments, radio front end circuitry and/or antenna 1411 can be considered an interface.

As illustrated, interface 1414 comprises radio front end circuitry 1412 and antenna 1411. Radio front end circuitry 1412 comprise one or more filters 1418 and amplifiers 1416. Radio front end circuitry 1414 is connected to antenna 1411 and processing circuitry 1420, and can be configured to condition signals communicated between antenna 1411 and processing circuitry 1420. Radio front end circuitry 1412 can be coupled to or a part of antenna 1411. In some embodiments, WD 1410 may not include separate radio front end circuitry 1412; rather, processing circuitry 1420 can comprise radio front end circuitry and can be connected to antenna 1411. Similarly, in some embodiments, some or all of RF transceiver circuitry 1422 can be considered a part of interface 1414. Radio front end circuitry 1412 can receive digital data that is to be sent out to other network nodes or WDs via a wireless connection. Radio front end circuitry 1412 can convert the digital data into a radio signal having the appropriate channel and bandwidth parameters using a combination of filters 1418 and/or amplifiers 1416. The radio signal can then be transmitted via antenna 1411. Similarly, when receiving data, antenna 1411 can collect radio signals which are then converted into digital data by radio front end circuitry 1412. The digital data can be passed to processing circuitry 1420. In other embodiments, the interface can comprise different components and/or different combinations of components.

Processing circuitry 1420 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1410 components, such as device readable medium 1430, WD 1410 functionality. Such functionality can include providing any of the various wireless features or benefits discussed herein.

For example, processing circuitry 1420 can execute instructions stored in device readable medium 1430 or in memory within processing circuitry 1420 to provide the functionality disclosed herein. More specifically, instructions (also referred to as a computer program product) stored in medium 1430 can include instructions that, when executed by processor 1420, can configure wireless device 1410 to perform operations corresponding to various exemplary methods (e.g., procedures) described herein.

As illustrated, processing circuitry 1420 includes one or more of RF transceiver circuitry 1422, baseband processing circuitry 1424, and application processing circuitry 1426. In other embodiments, the processing circuitry can comprise different components and/or different combinations of components. In certain embodiments processing circuitry 1420 of WD 1410 can comprise a SOC. In some embodiments, RF transceiver circuitry 1422, baseband processing circuitry 1424, and application processing circuitry 1426 can be on separate chips or sets of chips. In alternative embodiments, part or all of baseband processing circuitry 1424 and application processing circuitry 1426 can be combined into one chip or set of chips, and RF transceiver circuitry 1422 can be on a separate chip or set of chips. In still alternative embodiments, part or all of RF transceiver circuitry 1422 and baseband processing circuitry 1424 can be on the same chip or set of chips, and application processing circuitry 1426 can be on a separate chip or set of chips. In yet other alternative embodiments, part or all of RF transceiver circuitry 1422, baseband processing circuitry 1424, and application processing circuitry 1426 can be combined in the same chip or set of chips. In some embodiments, RF transceiver circuitry 1422 can be a part of interface 1414. RF transceiver circuitry 1422 can condition RF signals for processing circuitry 1420.

In certain embodiments, some or all of the functionality described herein as being performed by a WD can be provided by processing circuitry 1420 executing instructions stored on device readable medium 1430, which in certain embodiments can be a computer-readable storage medium. In alternative embodiments, some or all of the functionality can be provided by processing circuitry 1420 without executing instructions stored on a separate or discrete device readable storage medium, such as in a hard-wired manner. In any of those particular embodiments, whether executing instructions stored on a device readable storage medium or not, processing circuitry 1420 can be configured to perform the described functionality. The benefits provided by such functionality are not limited to processing circuitry 1420 alone or to other components of WD 1410, but are enjoyed by WD 1410 as a whole, and/or by end users and the wireless network generally.

Processing circuitry 1420 can be configured to perform any determining, calculating, or similar operations (e.g., certain obtaining operations) described herein as being performed by a WD. These operations, as performed by processing circuitry 1420, can include processing information obtained by processing circuitry 1420 by, for example, converting the obtained information into other information, comparing the obtained information or converted information to information stored by WD 1410, and/or performing one or more operations based on the obtained information or converted information, and as a result of said processing making a determination.

Device readable medium 1430 can be operable to store a computer program, software, an application including one or more of logic, rules, code, tables, etc. and/or other instructions capable of being executed by processing circuitry 1420. Device readable medium 1430 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1420. In some embodiments, processing circuitry 1420 and device readable medium 1430 can be considered to be integrated.

User interface equipment 1432 can include components that allow and/or facilitate a human user to interact with WD 1410. Such interaction can be of many forms, such as visual, audial, tactile, etc. User interface equipment 1432 can be operable to produce output to the user and to allow and/or facilitate the user to provide input to WD 1410. The type of interaction can vary depending on the type of user interface equipment 1432 installed in WD 1410. For example, if WD 1410 is a smart phone, the interaction can be via a touch screen; if WD 1410 is a smart meter, the interaction can be through a screen that provides usage (e.g., the number of gallons used) or a speaker that provides an audible alert (e.g., if smoke is detected). User interface equipment 1432 can include input interfaces, devices and circuits, and output interfaces, devices and circuits. User interface equipment 1432 can be configured to allow and/or facilitate input of information into WD 1410, and is connected to processing circuitry 1420 to allow and/or facilitate processing circuitry 1420 to process the input information. User interface equipment 1432 can include, for example, a microphone, a proximity or other sensor, keys/buttons, a touch display, one or more cameras, a USB port, or other input circuitry. User interface equipment 1432 is also configured to allow and/or facilitate output of information from WD 1410, and to allow and/or facilitate processing circuitry 1420 to output information from WD 1410. User interface equipment 1432 can include, for example, a speaker, a display, vibrating circuitry, a USB port, a headphone interface, or other output circuitry. Using one or more input and output interfaces, devices, and circuits, of user interface equipment 1432, WD 1410 can communicate with end users and/or the wireless network, and allow and/or facilitate them to benefit from the functionality described herein.

Auxiliary equipment 1434 is operable to provide more specific functionality which may not be generally performed by WDs. This can comprise specialized sensors for doing measurements for various purposes, interfaces for additional types of communication such as wired communications etc. The inclusion and type of components of auxiliary equipment 1434 can vary depending on the embodiment and/or scenario.

Power source 1436 can, in some embodiments, be in the form of a battery or battery pack. Other types of power sources, such as an external power source (e.g., an electricity outlet), photovoltaic devices or power cells, can also be used. WD 1410 can further comprise power circuitry 1437 for delivering power from power source 1436 to the various parts of WD 1410 which need power from power source 1436 to carry out any functionality described or indicated herein. Power circuitry 1437 can in certain embodiments comprise power management circuitry. Power circuitry 1437 can additionally or alternatively be operable to receive power from an external power source; in which case WD 1410 can be connectable to the external power source (such as an electricity outlet) via input circuitry or an interface such as an electrical power cable. Power circuitry 1437 can also in certain embodiments be operable to deliver power from an external power source to power source 1436. This can be, for example, for the charging of power source 1436. Power circuitry 1437 can perform any converting or other modification to the power from power source 1436 to make it suitable for supply to the respective components of WD 1410.

Figure 15:
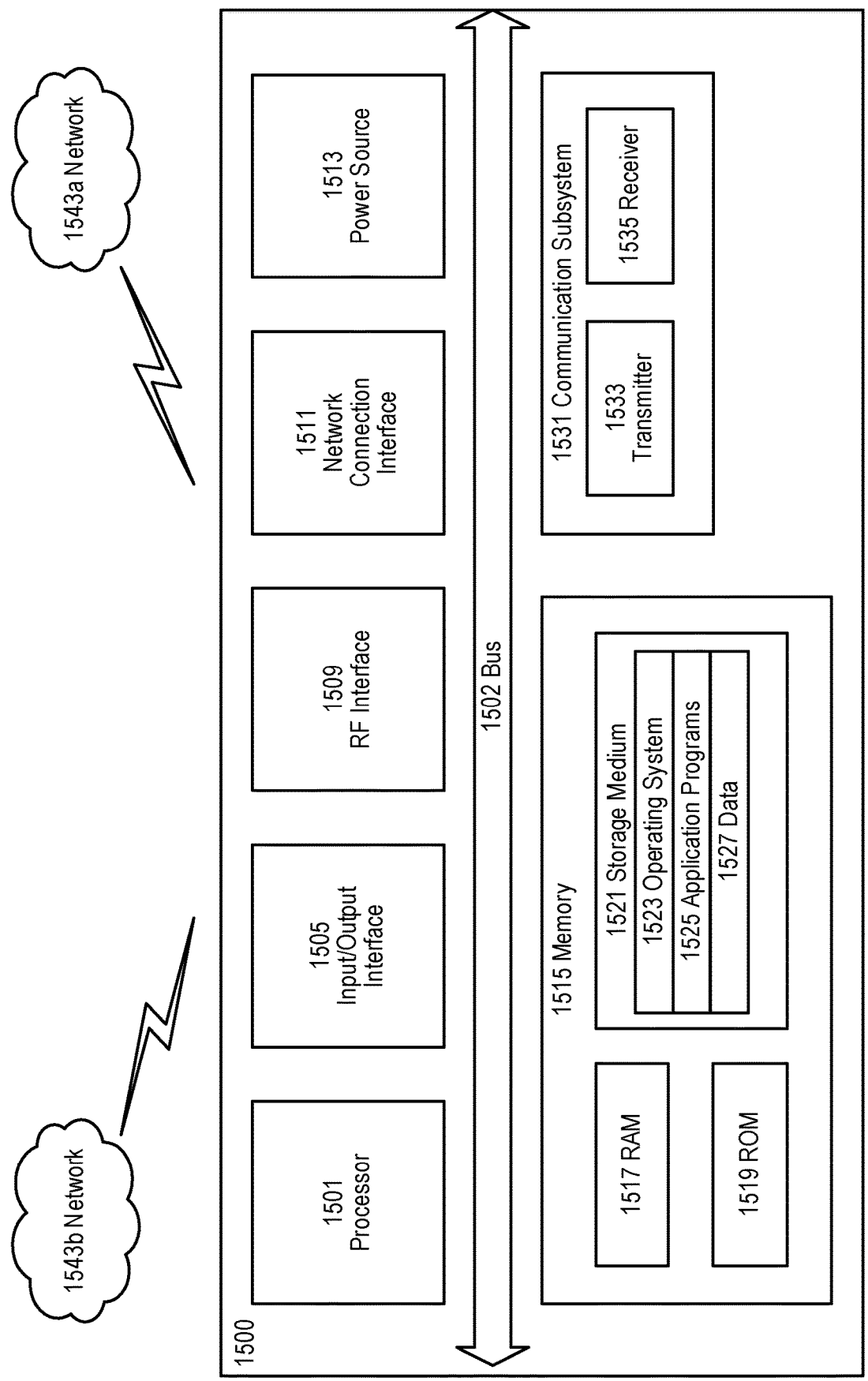
FIG. 15 illustrates an exemplary embodiment of a UE, in accordance with various aspects described herein.

FIG. 15 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 15200 can be any UE identified by the $3^{rd}$ Generation Partnership Project (3GPP), including a NB-IoT UE, a machine type communication (MTC) UE, and/or an enhanced MTC (eMTC) UE. UE 1500, as illustrated in FIG. 15, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 15 is a UE, the components discussed herein are equally applicable to a WD, and vice-versa.

In FIG. 15, UE 1500 includes processing circuitry 1501 that is operatively coupled to input/output interface 1505, radio frequency (RF) interface 1509, network connection interface 1511, memory 1515 including random access memory (RAM) 1517, read-only memory (ROM) 1519, and storage medium 1521 or the like, communication subsystem 1531, power source 1533, and/or any other component, or any combination thereof. Storage medium 1521 includes operating system 1523, application program 1525, and data 1527. In other embodiments, storage medium 1521 can include other similar types of information. Certain UEs can utilize all of the components shown in FIG. 15, or only a subset of the components. The level of integration between the components can vary from one UE to another UE. Further, certain UEs can contain multiple instances of a component, such as multiple processors, memories, transceivers, transmitters, receivers, etc.

In FIG. 15, processing circuitry 1501 can be configured to process computer instructions and data. Processing circuitry 1501 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1501 can include two central processing units (CPUs). Data can be information in a form suitable for use by a computer.

In the depicted embodiment, input/output interface 1505 can be configured to provide a communication interface to an input device, output device, or input and output device. UE 1500 can be configured to use an output device via input/output interface 1505. An output device can use the same type of interface port as an input device. For example, a USB port can be used to provide input to and output from UE 1500. The output device can be a speaker, a sound card, a video card, a display, a monitor, a printer, an actuator, an emitter, a smartcard, another output device, or any combination thereof. UE 1500 can be configured to use an input device via input/output interface 1505 to allow and/or facilitate a user to capture information into UE 1500. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 15, RF interface 1509 can be configured to provide a communication interface to RF components such as a transmitter, a receiver, and an antenna. Network connection interface 1511 can be configured to provide a communication interface to network 1543*a*. Network 1543*a* can encompass wired and/or wireless networks such as a local-area network (LAN), a wide-area network (WAN), a computer network, a wireless network, a telecommunications network, another like network or any combination thereof. For example, network 1543*a* can comprise a Wi-Fi network. Network connection interface 1511 can be configured to include a receiver and a transmitter interface used to communicate with one or more other devices over a communication network according to one or more communication protocols, such as Ethernet, TCP/IP, SONET, ATM, or the like. Network connection interface 1511 can implement receiver and transmitter functionality appropriate to the communication network links (e.g., optical, electrical, and the like). The transmitter and receiver functions can share circuit components, software or firmware, or alternatively can be implemented separately.

RAM 1517 can be configured to interface via bus 1502 to processing circuitry 1501 to provide storage or caching of data or computer instructions during the execution of software programs such as the operating system, application programs, and device drivers. ROM 1519 can be configured to provide computer instructions or data to processing circuitry 1501. For example, ROM 1519 can be configured to store invariant low-level system code or data for basic system functions such as basic input and output (I/O), startup, or reception of keystrokes from a keyboard that are stored in a non-volatile memory. Storage medium 1521 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 1521 can be configured to include operating system 1523, application program 1525 such as a web browser application, a widget or gadget engine or another application, and data file 1527. Storage medium 1521 can store, for use by UE 1500, any of a variety of various operating systems or combinations of operating systems. For example, application program 1525 can include executable program instructions (also referred to as a computer program product) that, when executed by processor 1501, can configure UE 1500 to perform operations corresponding to various exemplary methods (e.g., procedures) described herein.

Storage medium 1521 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1521 can allow and/or facilitate UE 1500 to access computer-executable instructions, application programs or the like, stored on transitory or non-transitory memory media, to off-load data, or to upload data. An article of manufacture, such as one utilizing a communication system can be tangibly embodied in storage medium 1521, which can comprise a device readable medium.

In FIG. 15, processing circuitry 1501 can be configured to communicate with network 1543*b* using communication subsystem 1531. Network 1543*a* and network 1543*b* can be the same network or networks or different network or networks. Communication subsystem 1531 can be configured to include one or more transceivers used to communicate with network 1543*b*. For example, communication subsystem 1531 can be configured to include one or more transceivers used to communicate with one or more remote transceivers of another device capable of wireless communication such as another WD, UE, or base station of a radio access network (RAN) according to one or more communication protocols, such as IEEE 802.15, CDMA, WCDMA, GSM, LTE, UTRAN, WiMax, or the like. Each transceiver can include transmitter 1533 and/or receiver 1535 to implement transmitter or receiver functionality, respectively, appropriate to the RAN links (e.g., frequency allocations and the like). Further, transmitter 1533 and receiver 1535 of each transceiver can share circuit components, software or firmware, or alternatively can be implemented separately.

In the illustrated embodiment, the communication functions of communication subsystem 1531 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1531 can include cellular communication, Wi-Fi communication, Bluetooth communication, and GPS communication. Network 1543*b* can encompass wired and/or wireless networks such as a local-area network (LAN), a wide-area network (WAN), a computer network, a wireless network, a telecommunications network, another like network or any combination thereof. For example, network 1543*b* can be a cellular network, a Wi-Fi network, and/or a near-field network. Power source 1513 can be configured to provide alternating current (AC) or direct current (DC) power to components of UE 1500.

The features, benefits and/or functions described herein can be implemented in one of the components of UE 1500 or partitioned across multiple components of UE 1500. Further, the features, benefits, and/or functions described herein can be implemented in any combination of hardware, software or firmware. In one example, communication subsystem 1531 can be configured to include any of the components described herein. Further, processing circuitry 1501 can be configured to communicate with any of such components over bus 1502. In another example, any of such components can be represented by program instructions stored in memory that when executed by processing circuitry 1501 perform the corresponding functions described herein. In another example, the functionality of any of such components can be partitioned between processing circuitry 1501 and communication subsystem 1531. In another example, the non-computationally intensive functions of any of such components can be implemented in software or firmware and the computationally intensive functions can be implemented in hardware.

Figure 16:
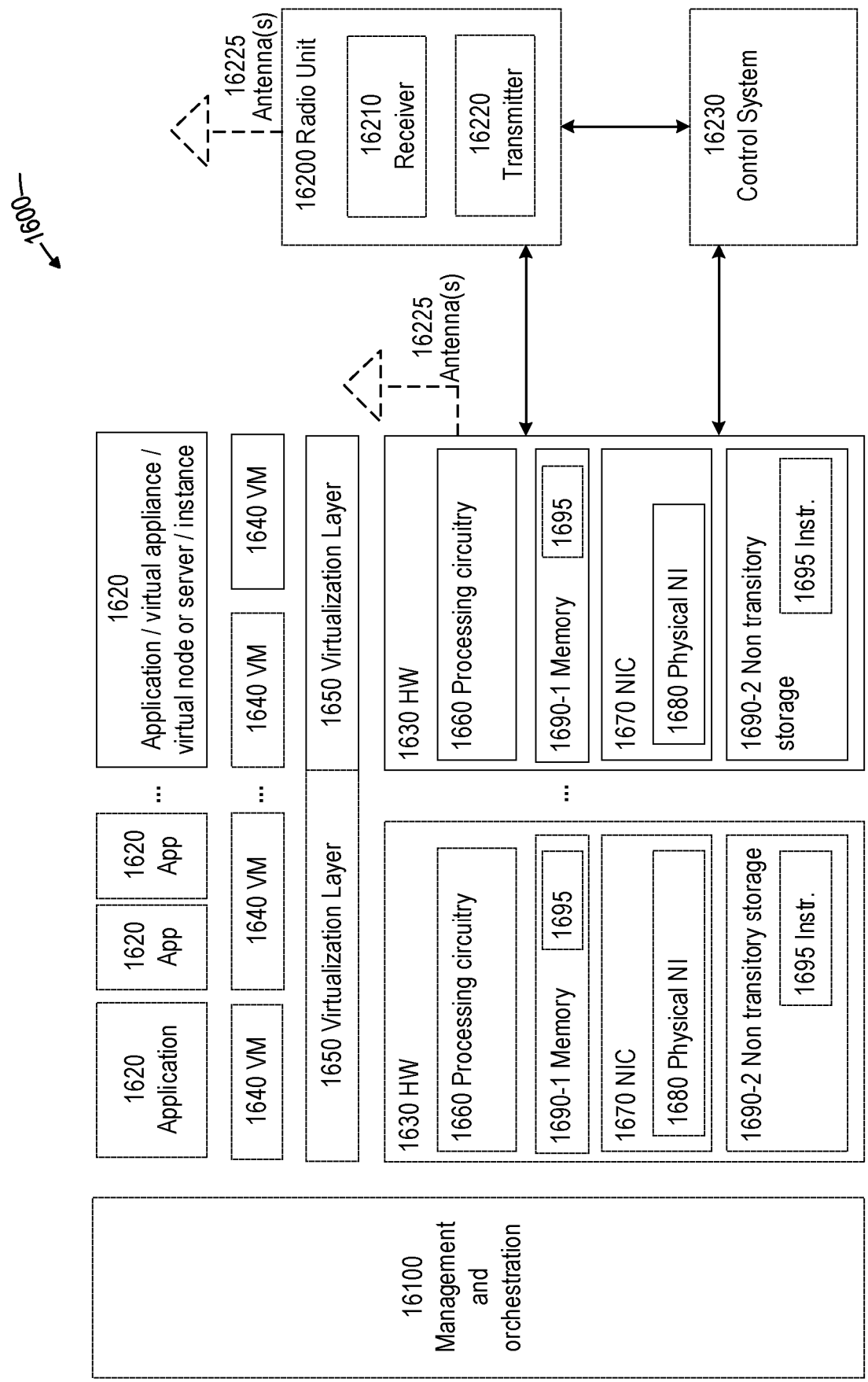
FIG. 16 is a block diagram illustrating an exemplary virtualization environment usable for implementation of various embodiments of network nodes described herein.

FIG. 16 is a schematic block diagram illustrating a virtualization environment 1600 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1600 hosted by one or more of hardware nodes 1630. Further, in embodiments in which the virtual node is not a radio access node or does not require radio connectivity (e.g., a core network node), then the network node can be entirely virtualized.

The functions can be implemented by one or more applications 1620 (which can alternatively be called software instances, virtual appliances, network functions, virtual nodes, virtual network functions, etc.) operative to implement some of the features, functions, and/or benefits of some of the embodiments disclosed herein. Applications 1620 are run in virtualization environment 1600 which provides hardware 1630 comprising processing circuitry 1660 and memory 1690. Memory 1690 contains instructions 1695 executable by processing circuitry 1660 whereby application 1620 is operative to provide one or more of the features, benefits, and/or functions disclosed herein.

Virtualization environment 1600 can include general-purpose or special-purpose network hardware devices (or nodes) 1630 comprising a set of one or more processors or processing circuitry 1660, which can be commercial off-the-shelf (COTS) processors, dedicated Application Specific Integrated Circuits (ASICs), or any other type of processing circuitry including digital or analog hardware components or special purpose processors. Each hardware device can comprise memory 1690-1 which can be non-persistent memory for temporarily storing instructions 1695 or software executed by processing circuitry 1660. For example, instructions 1695 can include program instructions (also referred to as a computer program product) that, when executed by processing circuitry 1660, can configure hardware node 1620 to perform operations corresponding to various exemplary methods (e.g., procedures) described herein. Such operations can also be attributed to virtual node(s) 1620 that is/are hosted by hardware node 1630.

Each hardware device can comprise one or more network interface controllers (NICs) 1670, also known as network interface cards, which include physical network interface 1680. Each hardware device can also include non-transitory, persistent, machine-readable storage media 1690-2 having stored therein software 1695 and/or instructions executable by processing circuitry 1660. Software 1695 can include any type of software including software for instantiating one or more virtualization layers 1650 (also referred to as hypervisors), software to execute virtual machines 1640 as well as software allowing it to execute functions, features, and/or benefits described in relation with some embodiments described herein.

Virtual machines 1640, comprise virtual processing, virtual memory, virtual networking or interface and virtual storage, and can be run by a corresponding virtualization layer 1650 or hypervisor. Different embodiments of the instance of virtual appliance 1620 can be implemented on one or more of virtual machines 1640, and the implementations can be made in different ways.

During operation, processing circuitry 1660 executes software 1695 to instantiate the hypervisor or virtualization layer 1650, which can sometimes be referred to as a virtual machine monitor (VMM). Virtualization layer 1650 can present a virtual operating platform that appears like networking hardware to virtual machine 1640.

As shown in FIG. 16, hardware 1630 can be a standalone network node with generic or specific components. Hardware 1630 can comprise antenna 16225 and can implement some functions via virtualization. Alternatively, hardware 1630 can be part of a larger cluster of hardware (e.g., such as in a data center or customer premise equipment (CPE)) where many hardware nodes work together and are managed via management and orchestration (MANO) 16100, which, among others, oversees lifecycle management of applications 1620.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1640 can be a software implementation of a physical machine that runs programs as if they were executing on a physical, non-virtualized machine. Each of virtual machines 1640, and that part of hardware 1630 that executes that virtual machine, be it hardware dedicated to that virtual machine and/or hardware shared by that virtual machine with others of the virtual machines 1640, forms a separate virtual network elements (VNE).

Still in the context of NFV, Virtual Network Function (VNF) is responsible for handling specific network functions that run in one or more virtual machines 1640 on top of hardware networking infrastructure 1630 and corresponds to application 1620 in FIG. 16.

In some embodiments, one or more radio units 16200 that each include one or more transmitters 16220 and one or more receivers 16210 can be coupled to one or more antennas 16225. Radio units 16200 can communicate directly with hardware nodes 1630 via one or more appropriate network interfaces and can be used in combination with the virtual components to provide a virtual node with radio capabilities, such as a radio access node or a base station.

In some embodiments, some signalling can be effected with the use of control system 16230 which can alternatively be used for communication between the hardware nodes 1630 and radio units 16200.

Figure 17:
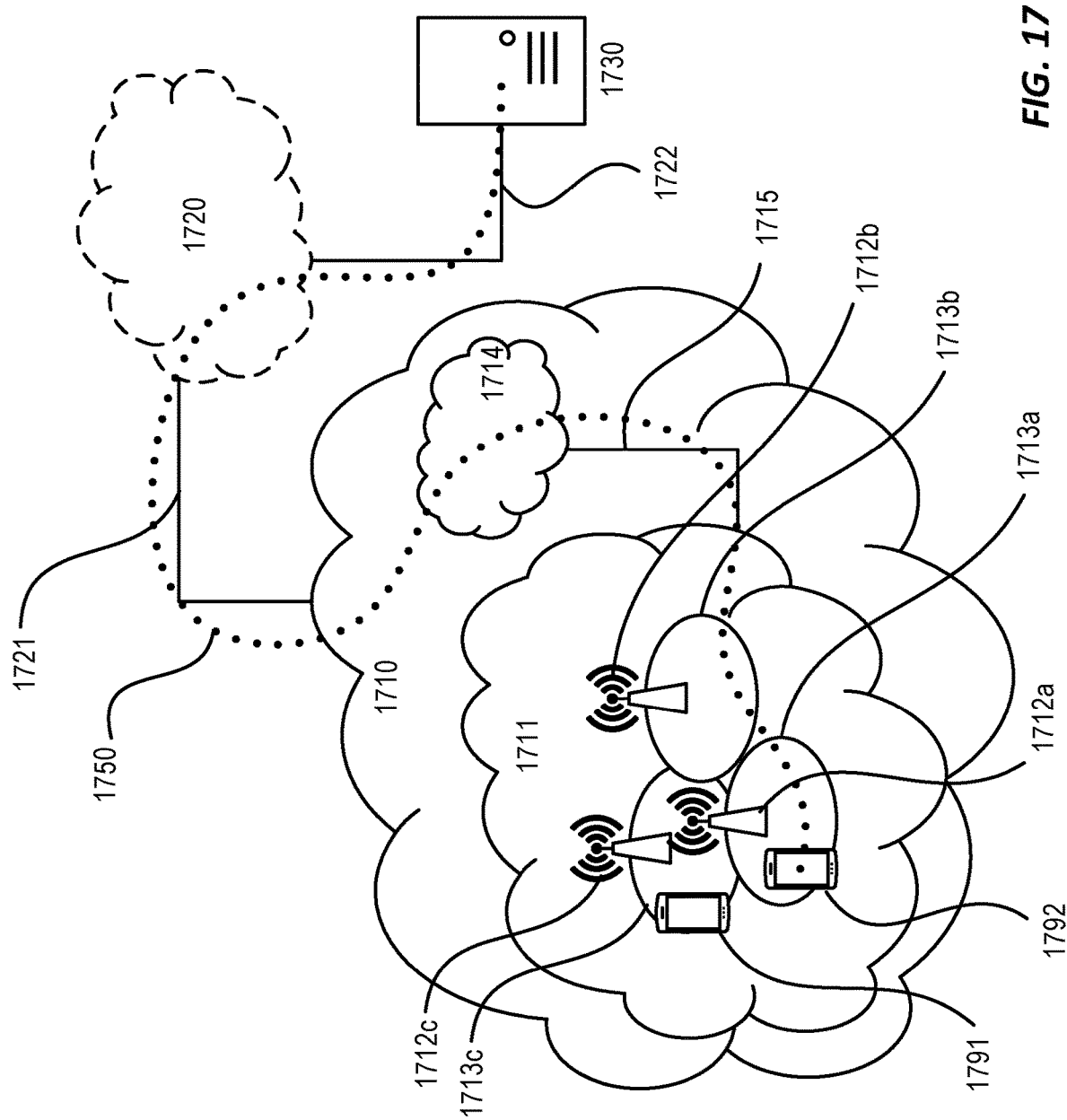
FIGS. 17-18 are block diagrams of various exemplary communication systems and/or networks, according to various exemplary embodiments of the present disclosure.

With reference to FIG. 17, in accordance with an embodiment, a communication system includes telecommunication network 1710, such as a 3GPP-type cellular network, which comprises access network 1711, such as a radio access network, and core network 1714. Access network 1711 comprises a plurality of base stations 1712a, 1712b, 1712c, such as NBs, eNBs, gNBs or other types of wireless access points, each defining a corresponding coverage area 1713a, 1713b, 1713c. Each base station 1712a, 1712b, 1712c is connectable to core network 1714 over a wired or wireless connection 1715. A first UE 1791 located in coverage area 1713c can be configured to wirelessly connect to, or be paged by, the corresponding base station 1712c. A second UE 1792 in coverage area 1713a is wirelessly connectable to the corresponding base station 1712a. While a plurality of UEs 1791, 1792 are illustrated in this example, the disclosed embodiments are equally applicable to a situation where a sole UE is in the coverage area or where a sole UE is connecting to the Telecommunication network 1710 is itself connected to host computer 1730, which can be embodied in the hardware and/or software of a standalone server, a cloud-implemented server, a distributed server or as processing resources in a server farm. Host computer 1730 can be under the ownership or control of a service provider, or can be operated by the service provider or on behalf of the service provider. Connections 1721 and 1722 between telecommunication network 1710 and host computer 1730 can extend directly from core network 1714 to host computer 1730 or can go via an optional intermediate network 1720. Intermediate network 1720 can be one of, or a combination of more than one of, a public, private or hosted network; intermediate network 1720, if any, can be a backbone network or the Internet; in particular, intermediate network 1720 can comprise two or more sub-networks (not shown).

The communication system of FIG. 17 as a whole enables connectivity between the connected UEs 1791, 1792 and host computer 1730. The connectivity can be described as an over-the-top (OTT) connection 1750. Host computer 1730 and the connected UEs 1791, 1792 are configured to communicate data and/or signaling via OTT connection 1750, using access network 1711, core network 1714, any intermediate network 1720 and possible further infrastructure (not shown) as intermediaries. OTT connection 1750 can be transparent in the sense that the participating communication devices through which OTT connection 1750 passes are unaware of routing of uplink and downlink communications. For example, base station 1712 may not or need not be informed about the past routing of an incoming downlink communication with data originating from host computer 1730 to be forwarded (e.g., handed over) to a connected UE 1791. Similarly, base station 1712 need not be aware of the future routing of an outgoing uplink communication originating from the UE 1791 towards the host computer 1730.

Example implementations, in accordance with an embodiment, of the UE, base station and host computer discussed in the preceding paragraphs will now be described with reference to FIG. 18. In communication system 1800, host computer 1810 comprises hardware 1815 including communication interface 1816 configured to set up and maintain a wired or wireless connection with an interface of a different communication device of communication system 1800. Host computer 1810 further comprises processing circuitry 1818, which can have storage and/or processing capabilities. In particular, processing circuitry 1818 can comprise one or more programmable processors, application-specific integrated circuits, field programmable gate arrays or combinations of these (not shown) adapted to execute instructions. Host computer 1810 further comprises software 1811, which is stored in or accessible by host computer 1810 and executable by processing circuitry 1818. Software 1811 includes host application 1812. Host application 1812 can be operable to provide a service to a remote user, such as UE 1830 connecting via OTT connection 1850 terminating at UE 1830 and host computer 1810. In providing the service to the remote user, host application 1812 can provide user data which is transmitted using OTT connection 1850.

Communication system 1800 can also include base station 1820 provided in a telecommunication system and comprising hardware 1825 enabling it to communicate with host computer 1810 and with UE 1830. Hardware 1825 can include communication interface 1826 for setting up and maintaining a wired or wireless connection with an interface of a different communication device of communication system 1800, as well as radio interface 1827 for setting up and maintaining at least wireless connection 1870 with UE 1830 located in a coverage area (not shown in FIG. 18) served by base station 1820. Communication interface 1826 can be configured to facilitate connection 1860 to host computer 1810. Connection 1860 can be direct or it can pass through a core network (not shown in FIG. 18) of the telecommunication system and/or through one or more intermediate networks outside the telecommunication system. In the embodiment shown, hardware 1825 of base station 1820 can also include processing circuitry 1828, which can comprise one or more programmable processors, application-specific integrated circuits, field programmable gate arrays or combinations of these (not shown) adapted to execute instructions.

Base station 1820 also includes software 1821 stored internally or accessible via an external connection. For example, software 1821 can include program instructions (also referred to as a computer program product) that, when executed by processing circuitry 1828, can configure base station 1820 to perform operations corresponding to various exemplary methods (e.g., procedures) described herein.

Communication system 1800 can also include UE 1830 already referred to. Its hardware 1835 can include radio interface 1837 configured to set up and maintain wireless connection 1870 with a base station serving a coverage area in which UE 1830 is currently located. Hardware 1835 of UE 1830 can also include processing circuitry 1838, which can comprise one or more programmable processors, application-specific integrated circuits, field programmable gate arrays or combinations of these (not shown) adapted to execute instructions.

UE 1830 also software 1831, which is stored in or accessible by UE 1830 and executable by processing circuitry 1838. Software 1831 includes client application 1832. Client application 1832 can be operable to provide a service to a human or non-human user via UE 1830, with the support of host computer 1810. In host computer 1810, an executing host application 1812 can communicate with the executing client application 1832 via OTT connection 1850 terminating at UE 1830 and host computer 1810. In providing the service to the user, client application 1832 can receive request data from host application 1812 and provide user data in response to the request data. OTT connection 1850 can transfer both the request data and the user data. Client application 1832 can interact with the user to generate the user data that it provides. Software 1831 can also include program instructions (also referred to as a computer program product) that, when executed by processing circuitry 1838, can configure UE 1830 to perform operations corresponding to various exemplary methods (e.g., procedures) described herein.

Figure 18:
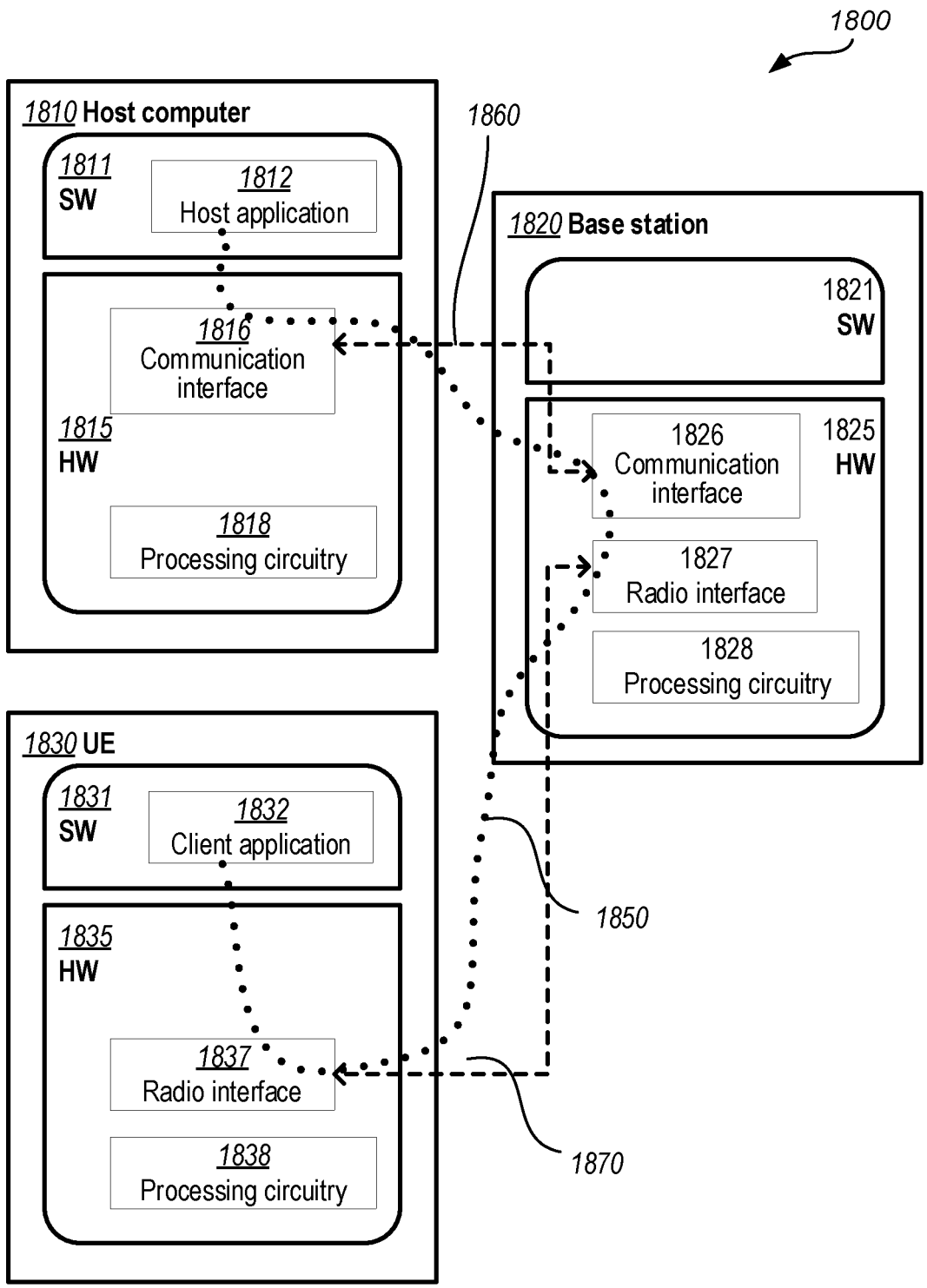

It is noted that host computer 1810, base station 1820 and UE 1830 illustrated in FIG. 18 can be similar or identical to host computer 1730, one of base stations 1712*a-c*, and one of UEs 1791-1792 of FIG. 17, respectively. This is to say, the inner workings of these entities can be as shown in FIG. 18 and independently, the surrounding network topology can be that of FIG. 17.

In FIG. 18, OTT connection 1850 has been drawn abstractly to illustrate the communication between host computer 1810 and UE 1830 via base station 1820, without explicit reference to any intermediary devices and the precise routing of messages via these devices. Network infrastructure can determine the routing, which it can be configured to hide from UE 1830 or from the service provider operating host computer 1810, or both. While OTT connection 1850 is active, the network infrastructure can further take decisions by which it dynamically changes the routing (e.g., on the basis of load balancing consideration or reconfiguration of the network).

Wireless connection 1870 between UE 1830 and base station 1820 is in accordance with the teachings of the embodiments described throughout this disclosure. One or more of the various embodiments improve the performance of OTT services provided to UE 1830 using OTT connection 1850, in which wireless connection 1870 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1850 between host computer 1810 and UE 1830, in response to variations in the measurement results. The measurement procedure and/or the network functionality for reconfiguring OTT connection 1850 can be implemented in software 1811 and hardware 1815 of host computer 1810 or in software 1831 and hardware 1835 of UE 1830, or both. In embodiments, sensors (not shown) can be deployed in or in association with communication devices through which OTT connection 1850 passes; the sensors can participate in the measurement procedure by supplying values of the monitored quantities exemplified above, or supplying values of other physical quantities from which software 1811, 1831 can compute or estimate the monitored quantities. The reconfiguring of OTT connection 1850 can include message format, retransmission settings, preferred routing etc.; the reconfiguring need not affect base station 1820, and it can be unknown or imperceptible to base station 1820. Such procedures and functionalities can be known and practiced in the art. In certain embodiments, measurements can involve proprietary UE signaling facilitating host computer 1810's measurements of throughput, propagation times, latency and the like. The measurements can be implemented in that software 1811 and 1831 causes messages to be transmitted, in particular empty or 'dummy' messages, using OTT connection 1850 while it monitors propagation times, errors etc.

FIG. 19 is a flowchart illustrating an exemplary method and/or procedure implemented in a communication system, in accordance with one embodiment. The communication system includes a host computer, a base station and a UE which, in some exemplary embodiments, can be those described with reference to FIGS. 17 and 18. For simplicity of the present disclosure, only drawing references to FIG. 19 will be included in this section. In step 1910, the host computer provides user data. In substep 1911 (which can be optional) of step 1910, the host computer provides the user data by executing a host application. In step 1920, the host computer initiates a transmission carrying the user data to the UE. In step 1930 (which can be optional), the base station transmits to the UE the user data which was carried in the transmission that the host computer initiated, in accordance with the teachings of the embodiments described throughout this disclosure. In step 1940 (which can also be optional), the UE executes a client application associated with the host application executed by the host computer.

FIG. 20 is a flowchart illustrating an exemplary method and/or procedure implemented in a communication system, in accordance with one embodiment. The communication system includes a host computer, a base station and a UE which can be those described with reference to FIGS. 17 and 18. For simplicity of the present disclosure, only drawing references to FIG. 20 will be included in this section. In step 2010 of the method, the host computer provides user data. In an optional substep (not shown) the host computer provides the user data by executing a host application. In step 2020, the host computer initiates a transmission carrying the user data to the UE. The transmission can pass via the base station, in accordance with the teachings of the embodiments described throughout this disclosure. In step 2030 (which can be optional), the UE receives the user data carried in the transmission.

FIG. 21 is a flowchart illustrating an exemplary method and/or procedure implemented in a communication system, in accordance with one embodiment. The communication system includes a host computer, a base station and a UE which can be those described with reference to FIGS. 17 and 18. For simplicity of the present disclosure, only drawing references to FIG. 21 will be included in this section. In step 2110 (which can be optional), the UE receives input data provided by the host computer. Additionally or alternatively, in step 2120, the UE provides user data. In substep 2121 (which can be optional) of step 2120, the UE provides the user data by executing a client application. In substep 2111 (which can be optional) of step 2110, the UE executes a client application which provides the user data in reaction to the received input data provided by the host computer. In providing the user data, the executed client application can further consider user input received from the user. Regardless of the specific manner in which the user data was provided, the UE initiates, in substep 2130 (which can be optional), transmission of the user data to the host computer. In step 2140 of the method, the host computer receives the user data transmitted from the UE, in accordance with the teachings of the embodiments described throughout this disclosure.

FIG. 22 is a flowchart illustrating an exemplary method and/or procedure implemented in a communication system, in accordance with one embodiment. The communication system includes a host computer, a base station and a UE which can be those described with reference to FIGS. 17 and 18. For simplicity of the present disclosure, only drawing references to FIG. 22 will be included in this section. In step 2210 (which can be optional), in accordance with the teachings of the embodiments described throughout this disclosure, the base station receives user data from the UE. In step 2220 (which can be optional), the base station initiates transmission of the received user data to the host computer. In step 2230 (which can be optional), the host computer receives the user data carried in the transmission initiated by the base station.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

As used herein unless expressly stated to the contrary, the phrases "at least one of" and "one or more of," followed by a conjunctive list of enumerated items (e.g., "A and B", "A, B, and C"), are intended to mean "at least one item, with each item selected from the list consisting of" the enumerated items. For example, "at least one of A and B" is intended to mean any of the following: A; B; A and B. Likewise, "one or more of A, B, and C" is intended to mean any of the following: A; B; C; A and B; B and C; A and C; A, B, and C.

As used herein unless expressly stated to the contrary, the phrase "a plurality of" followed by a conjunctive list of enumerated items (e.g., "A and B", "A, B, and C") is intended to mean "multiple items, with each item selected from the list consisting of" the enumerated items. For example, "a plurality of A and B" is intended to mean any of the following: more than one A; more than one B; or at least one A and at least one B.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

Example embodiments of the techniques and apparatus described herein include, but are not limited to, the following enumerated examples:

1. A method performed by a network node that is a target node candidate for a mobility operation of a user equipment (UE), the method comprising:

receiving, from a source node serving the UE, a request to prepare a mobility procedure for the UE in relation to a candidate target cell associated with the network node, wherein the request includes one or more characteristics associated with a downlink (DL) data connection of the UE;

based on the one or more characteristics, determining if the UE can be admitted for the requested mobility procedure;

based on a determination that the UE can be admitted:
determining whether to activate bicasting of the data connection; and
transmitting, to the source node, a response to the received request, the response including a bicasting configuration associated with the UE.

2. The method of embodiment 1, wherein the one or more characteristics comprises any of the following: UE buffer status; UE required data rate; UE connection active time; UE QoS class indicator (QCI); and Transmission Control Protocol (TCP) socket.

3. The method of embodiment 2, further comprising, based on a determination to activate bicasting, selecting a bicasting mode from a first mode associated with the source node and a second mode is associated with a core network connected to the network node via an interface, wherein the bicasting configuration includes an indication of the selected bicasting mode and a granted buffer size associated with the UE.

4. The method of any of embodiments 2-3, wherein determining whether the UE can be admitted is based on whether the UE buffer status is less than an amount of available buffer space in the network node.

5. The method of any of embodiments 2-3, wherein determining whether the UE can be admitted is based on whether the UE required data rate is less than an available transmission capacity in the target cell.

6. The method of any of embodiments 2-5, wherein determining whether to activate bicasting comprises receiving data via the TCP socket.

7. The method of any of embodiments 2-5, wherein determining whether to activate bicasting is based on whether the UE connection active time is greater than a threshold.

8. The method of embodiment 6, wherein determining whether to activate bicasting is further based on whether the UE required data rate is greater than a threshold.

9. The method of any of embodiments 2-5, wherein determining whether to activate bicasting is based on whether a delay budget associated with the UE QCI is less than a threshold.

10. The method of any of embodiments 3-9, wherein selecting a bicast mode is based on whether the UE required data rate is less than or equal to an available data rate on the interface.

11. The method of any of embodiments 3-10, further comprising, based on selecting the second mode, sending a request, to the core network, to initiate bicasting the data connection to the target node, wherein the request includes a bicast start position associated with a protocol layer used in the data connection.

12. The method of any of embodiments 3-10, further comprising:
buffering a first portion of received bicast data within the granted buffer size;
receiving, from the source node or the core network, an acknowledgement that the UE has successfully received the first portion; and in response to the acknowledgement, buffering a second portion of the received bicast data in the same buffer position as the first portion.

13. The method of any of embodiments 1-12, wherein the mobility procedure comprises one of the following: handover, conditional handover, resume, re-establishment, reconfiguration with synchronization, beam switch, and secondary cell (SCell) addition.

14. A method, performed by a source node, for mobility of a user equipment (UE) served by the source node, the method comprising:
transmitting, to a target node, a request to prepare a mobility procedure for the UE in relation to a candidate target cell associated with the target node, wherein the request includes one or more characteristics associated with a downlink (DL) data connection of the UE; and
receiving, from the target node, a response to the request, the response including a bicasting configuration associated with the UE.

15. The method of embodiment 14, wherein the one or more characteristics comprises any of the following: UE buffer status; UE required data rate; UE connection active time; UE QoS class indicator (QCI); and Transmission Control Protocol (TCP) socket.

16. The method of any of embodiments 14-15, wherein the bicasting configuration comprises:
an indication of a bicasting mode selected by the target node, wherein the bicasting mode is one of a first mode associated with the source node and a second mode associated with a core network connected to the source node; and
a granted buffer size associated with the UE.

17. The method of embodiment 16, further comprising, if the bicasting configuration indicates the first mode, initiating bicasting of the DL data connection to the target node.

18. The method of any of embodiments 16-17, further comprising, if the bicasting configuration indicates the second mode, sending a request, to the core network, to initiate bicasting the data connection to the target node, wherein the request includes a bicast start position associated with a protocol layer used in the data connection.

19. The method of any of embodiments 16-18, further comprising transmitting, to the target node, an acknowledgement that the UE has successfully received a first portion of the bicast data via the source node, wherein the size of the first portion is less than the granted buffer size.

20. The method of any of embodiments 14-19, wherein the mobility procedure comprises one of the following: handover, conditional handover, resume, re-establishment, reconfiguration with synchronization, beam switch, and secondary cell (SCell) addition.

21. A network node in a radio access network (RAN), comprising:
communication circuitry configured to communicate with one or more other network nodes and one or more user equipment (UE);
processing circuitry operably coupled to the communication circuitry and configured to perform operations corresponding to any of the methods of embodiments 1-20.

22. A network node configured to support conditional mobility of user equipment (UEs) among cells in a radio access network (RAN), the network node being arranged to perform operations corresponding to any of the methods of embodiments 1-20.

23. A non-transitory, computer-readable medium storing computer-executable instructions that, when executed by processing circuitry comprising a network node in radio access network (RAN), configure the network node to perform operations corresponding to any of the methods of claims 1-20.

24. A communication system including a host computer, the host computer comprising:
a. processing circuitry configured to provide user data; and
b. a communication interface configured to forward the user data to a cellular network for transmission to a user equipment (UE) through a core network (CN) and a radio access network (RAN);
wherein:
c. the RAN comprises first and second nodes;
d. the first node comprises a communication transceiver and processing circuitry configured to perform operations corresponding to any of the methods of embodiments 1-13; and
e. the second node comprises a communication transceiver and processing circuitry configured to perform operations corresponding to any of the methods of embodiments 14-20.

25. The communication system of the previous embodiment, further comprising the UE.

26. The communication system of any of the previous two embodiments, wherein:
f. the processing circuitry of the host computer is configured to execute a host application, thereby providing the user data; and
g. the UE comprises processing circuitry configured to execute a client application associated with the host application.

27. A method implemented in a communication system including a host computer, a cellular network, and a user equipment (UE), the method comprising:
a. at the host computer, providing user data;
b. at the host computer, initiating a transmission carrying the user data to the UE via a cellular network comprising an radio access network (RAN); and
c. operations, performed by first and second nodes of the RAN, corresponding to any of the methods of embodiments 1-20.

28. The method of the previous embodiment, wherein the data message comprises the user data, and further comprising transmitting the user data to the UE via the first node or the second node.

29. The method of any of the previous two embodiments, wherein the user data is provided at the host computer by executing a host application, the method further comprising, at the UE, executing a client application associated with the host application.

30. A communication system including a host computer comprising a communication interface configured to receive user data originating from a transmission from a user equipment (UE) via a first node or a second node in a radio access network (RAN), wherein:
a. the first node comprises a communication interface and processing circuitry configured to perform operations corresponding to any of the methods of embodiments 1-13; and
b. the second node comprises a communication interface and processing circuitry configured to perform operations corresponding to any of the methods of embodiments 14-20.

31. The communication system of the previous embodiment, further including the UE.

32. The communication system of any of the previous two embodiments, wherein:
  c. the processing circuitry of the host computer is configured to execute a host application;
  d. the UE is configured to execute a client application associated with the host application, thereby providing the user data to be received by the host computer.

The invention claimed is:
1. A method performed by a network node, in a radio access network (RAN), that is a target node candidate for a mobility operation of a user equipment (UE), the method comprising:
  receiving, from a source node serving the UE, a request to prepare a mobility procedure for the UE in relation to a candidate target cell associated with the network node, wherein the request includes one or more characteristics associated with a data connection of the UE, wherein the one or more characteristics comprise any of the following: status of a UE buffer at the source node, UE required data rate, UE connection active time, UE QoS class indicator (QCI), and an originating Transmission Control Protocol (TCP) socket for the data connection;
  based on the one or more characteristics, determining that the UE can be admitted for the requested mobility procedure;
  determining to activate bicasting of the data connection based on at least one of the following:
    the UE connection active time being greater than a first threshold,
    the UE required data rate being greater than a second threshold, and
    a delay budget associated with the UE QCI being less than a third threshold; and
  transmitting, to the source node, a response that includes a bicasting configuration associated with the UE.

2. The method of claim 1, wherein determining that the UE can be admitted is based on one or more of the following:
  the status of the UE buffer at the source node being less than an amount of available buffer space associated with the network node; and
  the UE required data rate being less than an available transmission capacity in the candidate target cell.

3. The method of claim 1, wherein determining to activate bicasting is further based on at least one characteristic of the data connection observed by listening to the originating TCP socket for the data connection.

4. The method of claim 1, wherein:
  the method further comprises selecting a bicasting mode from the following:
    a first mode associated with a first interface to the source node, and
    a second mode associated with a second interface to a core network; and
  the bicasting configuration includes an indication of the selected bicasting mode and an indication of a size of a buffer space granted by the network node to the UE.

5. The method of claim 4, wherein selecting a bicasting mode comprises:
  selecting the second mode based on the UE required data rate being less than or equal to an available capacity on the second interface; and
  selecting the first mode based on the UE required data rate being greater than the available capacity on the second interface.

6. The method of claim 4, wherein:
  the method further comprises, based on selecting the second mode, sending a request, to the core network, to initiate bicasting the data connection to the target node; and
  the request includes a bicast start position associated with a protocol layer used in the data connection.

7. The method of claim 4, further comprising:
  buffering a first portion of bicast data in the buffer space granted by the network node to the UE;
  receiving, from the source node or the core network, an acknowledgement that the UE has successfully received the first portion; and
  in response to the acknowledgement, buffering a second portion of bicast data in the buffer space granted by the network node to the UE by overwriting at least some of the first portion.

8. The method of claim 7, wherein the acknowledgement includes a transmission control Protocol (TCP) acknowledgement number or a packet data convergence protocol (PDCP) sequence number.

9. A non-transitory, computer-readable medium storing program instructions that, when executed by processing circuitry of a network node in a radio access network (RAN), configure the network node to perform operations corresponding to the method of claim 1.

10. A method, performed by a source node in a radio access network (RAN), for mobility of a user equipment (UE) served by the source node, the method comprising:
  transmitting, to a target node in the RAN, a request to prepare a mobility procedure for the UE in relation to a candidate target cell associated with the target node, wherein the request includes one or more characteristics associated with a data connection of the UE; and
  receiving, from the target node, a response that includes a bicasting configuration associated with the UE, wherein the bicasting configuration includes:
    an indication of a size of a buffer space granted by the target node to the UE; and
    an indication of a bicasting mode selected by the target node from the following:
      a first mode associated with a first interface to the target node, and
      a second mode associated with a second interface between the target node and a core network.

11. The method of claim 10, wherein the one or more characteristics comprises any of the following: status of a UE buffer at the source node; UE required data rate; UE connection active time; UE QoS class indicator (QCI); and an originating Transmission Control Protocol (TCP) socket for the data connection.

12. The method of claim 10, further comprising, based on the bicasting configuration indicating the first mode, initiating bicasting of the data connection to the target node via the first interface.

13. The method of claim 10, wherein:
  the method further comprises, based on the bicasting configuration indicating the second mode, sending a request, to the core network, to initiate bicasting the data connection to the source node; and
  the request includes a bicast start position associated with a protocol layer used in the data connection.

14. The method of claim 10, wherein:
  the method further comprises transmitting, to the target node, an acknowledgement that the UE has successfully received a first portion of bicast data via the source node; and the size of the first portion is less than the size of the buffer space granted by the target node to the UE.

15. The method of claim 14, wherein the acknowledgement includes one of the following:
   a transmission control Protocol (TCP) acknowledgement number; or
   a packet data convergence protocol (PDCP) sequence number.

16. A network node, in a radio access network (RAN), configured to facilitate a mobility operation for one or more user equipment (UEs) between cells of the RAN, the network node comprising:
   communication interface circuitry configured to communicate with a further network node in the RAN; and
   processing circuitry operably coupled with the communication interface circuitry, whereby the processing circuitry and the communication interface circuitry are configured to perform operations corresponding to the method of claim 10.

17. A network node, in a radio access network (RAN), configured to facilitate a mobility operation for one or more user equipment (UEs) between cells of the RAN, the network node comprising:
   communication interface circuitry configured to communicate with a further network node in the RAN; and
   processing circuitry operably coupled with the communication interface circuitry, whereby the processing circuitry and the communication interface circuitry are configured to:
      receive, from a source node serving the UE, a request to prepare a mobility procedure for the UE in relation to a candidate target cell associated with the network node, wherein the request includes one or more characteristics associated with a data connection of the UE, wherein the one or more characteristics comprise any of the following: status of a UE buffer at the source node, UE required data rate, UE connection active time, UE QoS class indicator (QCI), and an originating Transmission Control Protocol (TCP) socket for the data connection;
      based on the one or more characteristics, determine that the UE can be admitted for the requested mobility procedure;
      determine to activate bicasting of the data connection based on at least one of the following:
         the UE connection active time being greater than a first threshold,
         the UE required data rate being greater than a second threshold, and
         a delay budget associated with the UE QCI being less than a third threshold; and
      transmit, to the source node, a response that includes a bicasting configuration associated with the UE.

* * * * *